United States Patent
Crosatti et al.

(10) Patent No.: US 12,263,759 B2
(45) Date of Patent: Apr. 1, 2025

(54) TEMPERATURE CONTROL APPARATUS

(71) Applicant: Rivian IP Holdings, LLC, Irvine, CA (US)

(72) Inventors: Lorenzo Crosatti, Aliso Viejo, CA (US); Najmeh Rahimi, Lake Forest, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 3 days.

(21) Appl. No.: 17/835,476

(22) Filed: Jun. 8, 2022

(65) Prior Publication Data
US 2023/0398904 A1    Dec. 14, 2023

(51) Int. Cl.
| | |
|---|---|
| *B60L 58/26* | (2019.01) |
| *F28F 9/22* | (2006.01) |
| *H01M 10/613* | (2014.01) |
| *H01M 10/625* | (2014.01) |
| *H01M 10/6554* | (2014.01) |
| *H01M 10/6556* | (2014.01) |
| *H01M 10/6568* | (2014.01) |

(52) U.S. Cl.
CPC ................ *B60L 58/26* (2019.02); *F28F 9/22* (2013.01); *H01M 10/613* (2015.04); *H01M 10/625* (2015.04); *H01M 10/6554* (2015.04); *H01M 10/6556* (2015.04); *H01M 10/6568* (2015.04); *H01M 2220/20* (2013.01)

(58) Field of Classification Search
CPC ......... B60L 58/26; F28F 9/22; H01M 10/613; H01M 10/625; H01M 10/6554; H01M 10/6556; H01M 10/6568; H01M 2220/20
USPC ............................................................ 165/41
See application file for complete search history.

(56) References Cited

U.S. PATENT DOCUMENTS

| | | | |
|---|---|---|---|
| 6,241,011 B1 * | 6/2001 | Nakamura | F28F 3/044 |
| | | | 165/176 |
| 9,318,782 B2 * | 4/2016 | Hirsch | H01M 10/613 |
| 2012/0107663 A1 | 5/2012 | Burgers et al. | |
| 2016/0204486 A1 | 7/2016 | Kenney et al. | |
| 2017/0244143 A1 | 8/2017 | Burgers et al. | |
| 2018/0205125 A1 * | 7/2018 | Burgers | F28F 9/0204 |
| 2018/0252479 A1 | 9/2018 | Kenney et al. | |
| 2018/0337434 A1 | 11/2018 | Burgers et al. | |
| 2019/0077276 A1 * | 3/2019 | Capati | H05K 7/20872 |
| 2019/0109357 A1 | 4/2019 | Kenney | |
| 2019/0234695 A1 * | 8/2019 | Vucenic | F28F 3/042 |
| 2019/0356028 A1 * | 11/2019 | Cassard | H01M 50/229 |
| 2019/0366876 A1 | 12/2019 | Cheadle et al. | |
| 2020/0136205 A1 | 4/2020 | Graves et al. | |
| 2020/0136214 A1 * | 4/2020 | Graves | H01M 10/613 |
| 2020/0153062 A1 | 5/2020 | Collins | |
| 2020/0240721 A1 * | 7/2020 | Kenney | F28D 1/035 |
| 2020/0243934 A1 | 7/2020 | Galvis et al. | |
| 2020/0398634 A1 * | 12/2020 | Cheadle | F24H 1/121 |

(Continued)

*Primary Examiner* — Len Tran
*Assistant Examiner* — Gustavo A Hincapie Serna
(74) *Attorney, Agent, or Firm* — Foley & Lardner LLP

(57) ABSTRACT

Provided herein is an apparatus to regulate heat transfer. The apparatus can include a first plenum. The apparatus can include a second plenum. The apparatus can include a channel coupled with the first plenum. The channel can be coupled with the second plenum. The apparatus can include a third plenum coupled with the second plenum. The apparatus can include a bypass coupled with the second plenum and with the third plenum.

20 Claims, 19 Drawing Sheets

(56) References Cited

U.S. PATENT DOCUMENTS

| | | |
|---|---|---|
| 2021/0025655 A1* | 1/2021 | Vakilimoghaddam .. F28F 3/046 |
| 2021/0104790 A1* | 4/2021 | Mazza ................ H01M 50/204 |
| 2021/0242516 A1* | 8/2021 | Rahim .................... B60L 50/64 |
| 2021/0247145 A1* | 8/2021 | Vakilimoghaddam ...................... F28D 1/0341 |
| 2021/0254895 A1* | 8/2021 | Vakilimoghaddam ...................... F28D 1/035 |
| 2022/0029221 A1* | 1/2022 | Muller ................ H01M 10/643 |
| 2022/0120518 A1 | 4/2022 | Vanderwees et al. |
| 2022/0336883 A1 | 10/2022 | Galvis et al. |
| 2022/0404100 A1* | 12/2022 | Vanderwees .......... H01L 23/473 |
| 2023/0011595 A1* | 1/2023 | Jang ................. H01M 10/6554 |
| 2023/0021121 A1* | 1/2023 | Taniguchi .............. B60K 11/02 |
| 2023/0042629 A1* | 2/2023 | Shin .................... H01M 10/625 |
| 2023/0187728 A1* | 6/2023 | Jang ................... H01M 50/262 429/120 |
| 2023/0246291 A1* | 8/2023 | Kim .................... H01M 50/204 429/82 |

* cited by examiner

FIG. 6

TEMPERATURE CONTROL APPARATUS

INTRODUCTION

A battery cell can charge to store or discharge electrical energy to provide electric current to components electrically coupled therewith. The battery cell can emit thermal energy and radiate heat.

SUMMARY

The present disclosure is directed to an apparatus to regulate heat transfer. During operation, a set of battery cell in a battery module can supply electrical power to components electrically coupled with the battery module. While supplying, the battery cells of the battery module can generate thermal energy and emit heat from the body of each battery cell. The apparatus (e.g., a cold plate) can carry coolant can be thermally coupled with a side of the battery module to distribute heat more even throughout the battery module. The apparatus can have at least one first plenum coupled with an inlet, at least one second plenum coupled with an outlet, a set of channels coupling the two plenums in various configurations. Under a parallel configuration, the set of channels between the first plenum and the second plenum can be parallel with one another to carry coolant from the first plenum to the second plenum. Under a hybrid configuration, the set of channels between the first plenum and the second plenum can be non-linear (e.g., in a serpentine pattern). The configurations of the plenums and the channels can allow for a more consistent coolant pressure throughout the apparatus and more even distribution of heat throughout the battery module thermally coupled with the apparatus.

At least one aspect is directed to an apparatus. The apparatus can include a first plenum. The apparatus can include a second plenum. The apparatus can include a channel coupled with the first plenum. The channel can be coupled with the second plenum. The apparatus can include a third plenum coupled with the second plenum. The apparatus can include a bypass coupled with the second plenum and with the third plenum.

At least one aspect is directed to a method. The method can include defining a first plenum, a second plenum, and a third plenum. The method can include coupling a channel with the first plenum. The method can include coupling the channel with the second plenum. The method can include coupling the third plenum with the second plenum. The method can include a coupling bypass with the second plenum and with the third plenum.

At least one aspect is directed to an electric vehicle. The electric vehicle can include a battery pack to power one or more components of the electric vehicle. The electric vehicle can include a battery module disposed in the battery pack. The electric vehicle can include a cold plate coupled with the battery module. The cold plate can include a first plenum. The cold plate can include a second plenum. The cold plate can include a channel coupled with the first plenum. The channel can be coupled with the second plenum. The cold plate can include a third plenum coupled with the second plenum. The cold plate can include a bypass coupled with the second plenum and with the third plenum.

At least one aspect is directed to a method of provision. The method can include providing an apparatus. The apparatus can include a first plenum. The apparatus can include a second plenum. The apparatus can include a channel coupled with the first plenum. The channel can be coupled with the second plenum. The apparatus can include a third plenum coupled with the second plenum. The apparatus can include a bypass coupled with the second plenum and with the third plenum.

At least one aspect is directed to an apparatus. The apparatus can include a first plenum. The apparatus can include a second plenum. The apparatus can include a channel. The channel can include a first end coupled with the first plenum, a second end coupled with the second plenum, a first turn from the first end toward the second plenum, and a second turn from the second plenum toward the second end At least one aspect is directed to a method. The method can include defining a first plenum and a second plenum. The method can include defining a channel. The channel can include a first end coupled with the first plenum, a second end coupled with the second plenum, a first turn from the first end toward the second plenum, and a second turn from the second plenum toward the second end At least one aspect is directed to an electric vehicle. The electric vehicle can include a battery pack to power one or more components of the electric vehicle. The electric vehicle can include a battery module disposed in the battery pack. The electric vehicle can include a cold plate coupled with the battery module. The cold plate can include a first plenum. The cold plate can include a second plenum. The cold plate can include a channel. The channel can include a first end coupled with the first plenum, a second end coupled with the second plenum, a first turn from the first end toward the second plenum, and a second turn from the second plenum toward the second end At least one aspect is directed to a method of provision. The method can include providing an apparatus. The apparatus can include a first plenum. The apparatus can include a second plenum. The apparatus can include a channel. The channel can include a first end coupled with the first plenum, a second end coupled with the second plenum, a first turn from the first end toward the second plenum, and a second turn from the second plenum toward the second end At least one aspect is directed to an apparatus. The apparatus can include a first plenum comprising an end portion. The apparatus can include a second plenum comprising a first channel and a second channel. The first channel and the second channel can terminate at the end portion of the first plenum.

At least one aspect is directed to a method. The method can include defining a first plenum comprising an end portion. The method can include defining a second plenum comprising a first channel and a second channel. The first channel and the second channel can terminate at the end portion of the first plenum.

At least one aspect is directed to an electric vehicle. The electric vehicle can include a battery pack to power one or more components of the electric vehicle. The electric vehicle can include a battery module disposed in the battery pack. The electric vehicle can include a cold plate coupled with the battery module. The cold plate can include a first plenum comprising an end portion. The cold plate can include a second plenum comprising a first channel and a second channel. The first channel and the second channel can terminate at the end portion of the first plenum.

At least one aspect is directed to a method of provision. The method can include providing an apparatus. The apparatus can include a first plenum comprising an end portion. The apparatus can include a second plenum comprising a first channel and a second channel. The first channel and the second channel can terminate at the end portion of the first plenum.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 depicts an isometric view of an example of an apparatus to regulate heat transfer;

DETAILED DESCRIPTION

Figure 1:
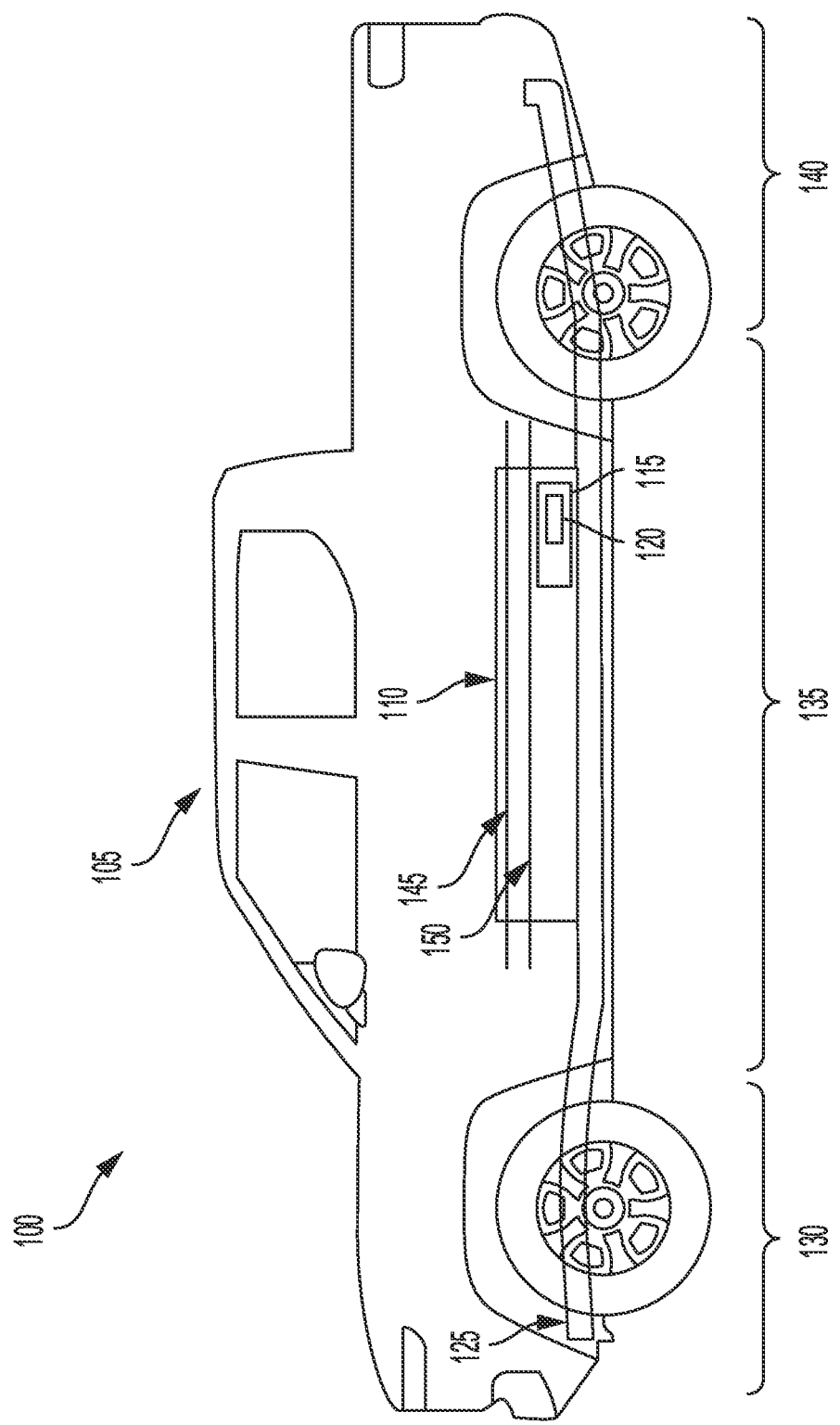
FIG. 1 depicts a cross-sectional view of an example of an electric vehicle installed with a battery pack

Following below are more detailed descriptions of various concepts related to, and implementations of, methods, apparatuses, and systems of heat transfer. The various concepts introduced above and discussed in greater detail below may be implemented in any of numerous ways.

A battery pack can house a set of battery cells and can store electrical energy for one or more electrical components, such as electrical or electromechanical devices in an electric vehicle. During operation, the battery cells can supply electric power to the components electrically coupled with the battery module. In providing electric current to the components, the battery cells can generate thermal energy and emit heat from the body of each battery cell into the battery pack and its surroundings. The resulting distribution of the heat throughout the battery pack can be uneven, for example, with battery cells in one area (e.g., an inner region) of the battery pack having lower heat than the battery cells in another area (e.g., an outer region) of the battery pack. The uneven distribution of thermal energy in the battery packet can have deleterious effects on the battery cells therein, and can effect battery pack or electric vehicle performance. For example, battery packs having a larger variance in heat distribution can have a shorter lifespan, less efficient charging characteristics, or decreased power output relative to a battery pack with a more uniform heat or thermal energy distribution.

At least one technical solution to these and other problems relates to an apparatus such as a cold plate having one or more plenums (e.g., channels, conduits, or pathways) that can divide the conveyance of coolant through the cold plate. In conveying the coolant, the cold plate draw heat away from the battery cells to attain a more even distribution of thermal energy. The plenums can have various configurations. For example, the cold plate plenums can have a parallel configuration. Under the parallel configuration, the cold plate can have a first plenum (e.g., an inlet plenum) fluidly coupled with an inlet to receive the coolant. The first plenum can convey or transfer the coolant from the inlet along one side of the cold plate toward a terminal end. The cold plate can include one or more channels, which for example can be parallel with one another. The channels can couple the first (e.g. inlet) plenum with a second (e.g., intermediate) plenum to carry the coolant from the first plenum to the second plenum. The cold plate can include a third plenum (e.g., an outlet, return, or egress plenum) fluidly coupled with an outlet to release the coolant from the cold plate. The third plenum can have a starting end coupled with a terminal end of the second (e.g., intermediate) plenum to carry the coolant from the second plenum to the third plenum. The cold plate can include at least one bypass that fluidly couples the second plenum with the third plenum. The bypass can permit passage of a portion of the coolant from the second plenum to the third plenum. For example, some of the coolant fluid can flow from the second plenum to the third plenum via the terminal end of the second plenum. In addition, some of the coolant fluid can instead flow from the second plenum to the third plenum via the bypass (e.g., without passing through the terminal end of the second plenum).

The cold plate apparatus can have a hybrid configuration. For example, the cold plate can include a first (e.g. inlet) plenum fluidly coupled with an inlet to receive the coolant. The first plenum can convey or transfer the coolant from the inlet toward a terminal end of the first plenum. The cold plate can have a second (e.g., outlet) plenum fluidly coupled with an outlet at to release the coolant from the cold plate. For example, the first plenum and the second plenum can be disposed at or near the longitudinal edges of the cold plate, although other configurations are possible. The cold plate can have an area (e.g., between the longitudinal edges) in which one or more channels can be disposed between the first plenum and the second plenum to fluidly couple with the first plenum and second plenum. The channel can be non-linear. For example, the channel can have one or more turns in direction along its path between first plenum and the second plenum (e.g., in a serpentine pattern). The coolant can flow from the first plenum to the second plenum via the channel. For example, each channel can have multiple turns to redirect the flow of the coolant toward the inlet plenum or toward to the outlet plenum before the coolant passes from the channel to the outlet plenum. The outlet plenum can convey the coolant received from the inlet plenum to the outlet disposed, for example, along an opposite side or edge of the cold plate relative to the inlet. Furthermore, the cold plate can have a bypass at or near the terminal end of the inlet plenum to fluidly couple the inlet plenum with a channel. The bypass can allow at least a portion of the coolant to flow from the first plenum to a portion of one of the channels.

The apparatus (e.g., cold plate) can include plenums, channels, and bypass elements structurally configured to maintain a uniform flow distribution as the coolant travels through the apparatus. The uniform flow, within a tolerance range, can minimize the temperature gradient or variance throughout the battery pack, so that the apparatus can regulate or maintain the distribution of temperature in the battery cells to within the acceptable range (e.g., within 5-10° C.). This can allow for more efficient battery pack performance, or can extend the useable life of the battery pack to, for example, power an electric vehicle.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
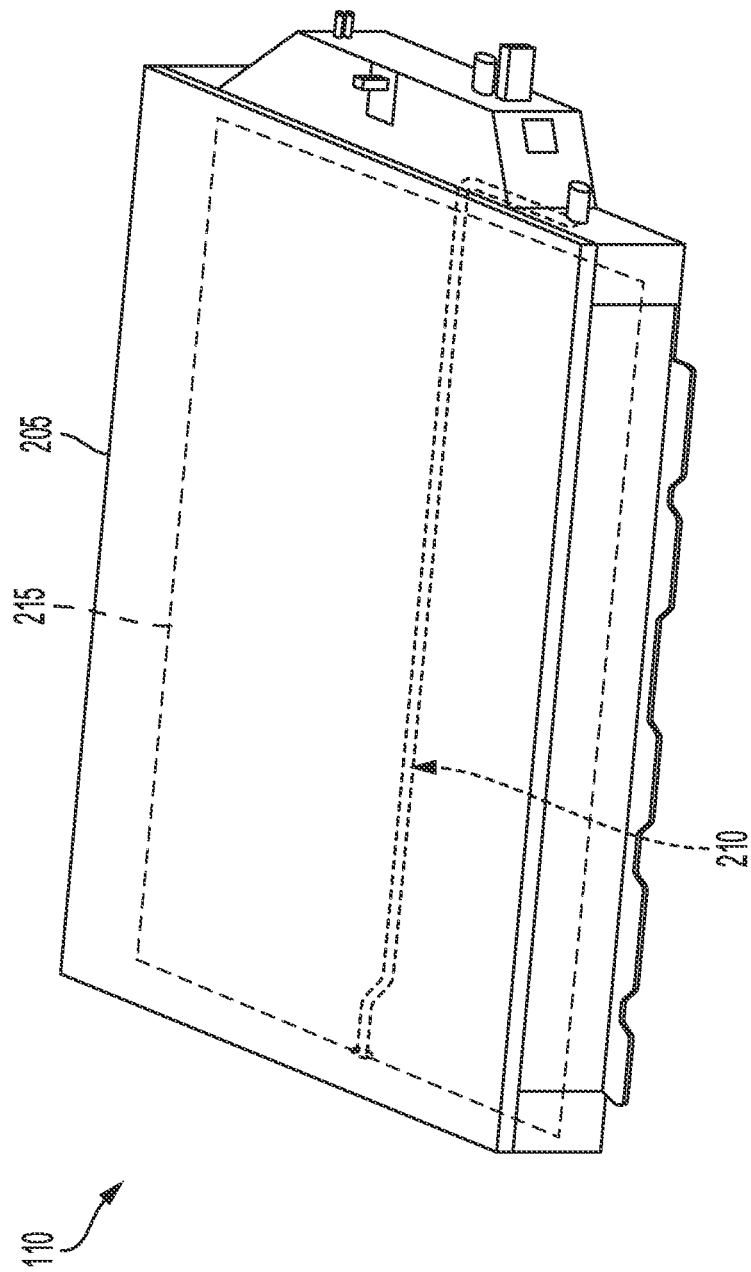
FIG. 2A depicts an isometric view of an example of a battery pack for powering an electric vehicle.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.).

The battery pack 110 can include at least one manifold 210 that can convey, circulate, or otherwise distribute a fluid (e.g., a coolant) through the battery pack 110 as part of a thermal or temperature control or heat exchange system. The battery pack 110 can also include at least one apparatus 215 to regulate heat transfer (e.g., a cold plate). The manifold 210 can be coupled with, part of, or independent from the apparatus 215. The fluid distributed by the manifold 210 can be a liquid and can include, for example, water, antifreeze, polyalkylene glycol, liquid nitrogen, hydrofluorocarbons (HFCs), and perfluorocarbons (PFCs), among others. The fluid can be gaseous, and can include, for example, hydrogen, helium, carbon dioxide, sulfur hexafluoride, among others. The fluid can be conveyed through the manifold 210.

Figure 2B:
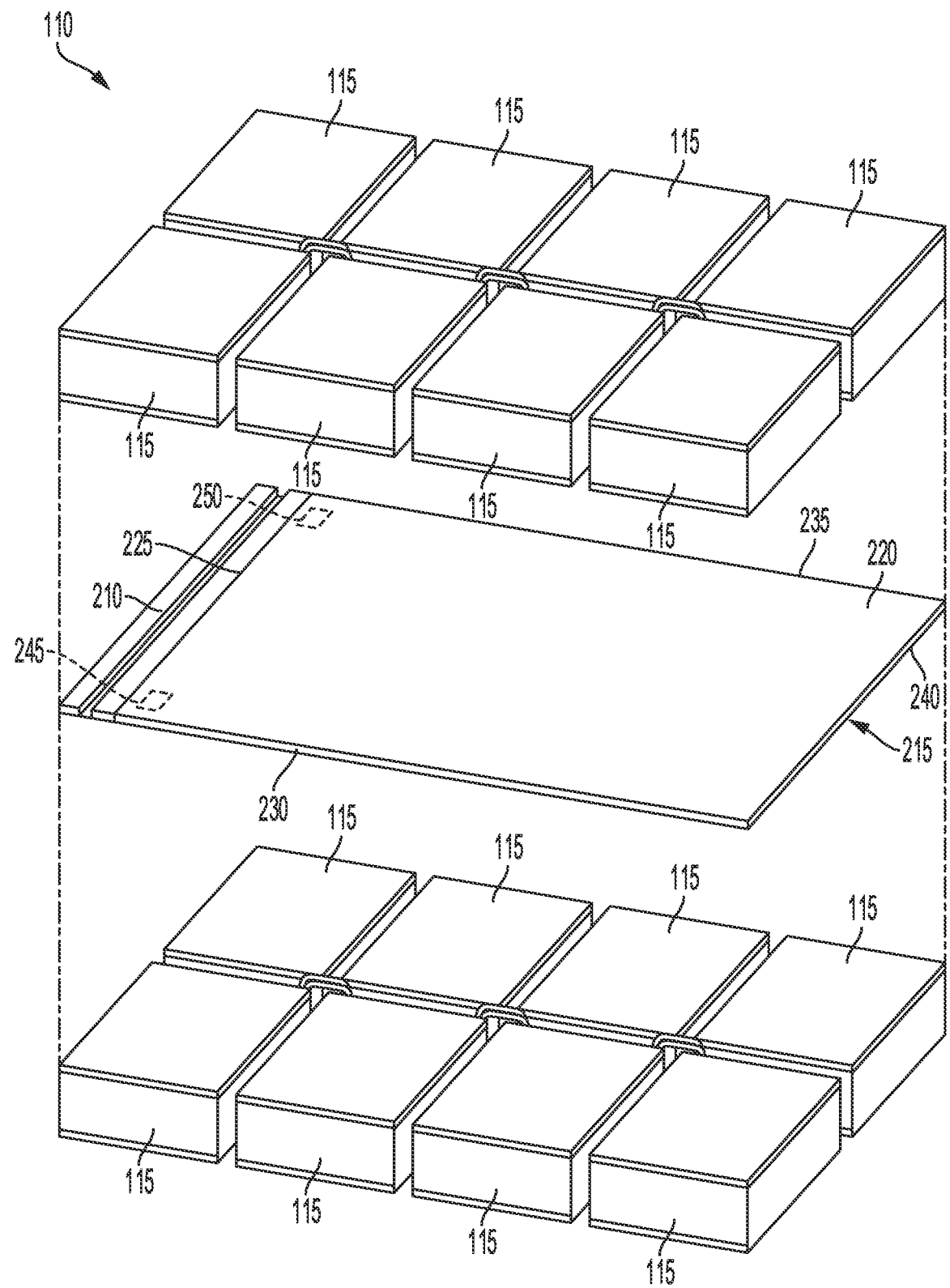
FIG. 2B depicts an isometric view of an example of a set of battery modules of a battery pack in an electric vehicle.
Figure 2C:
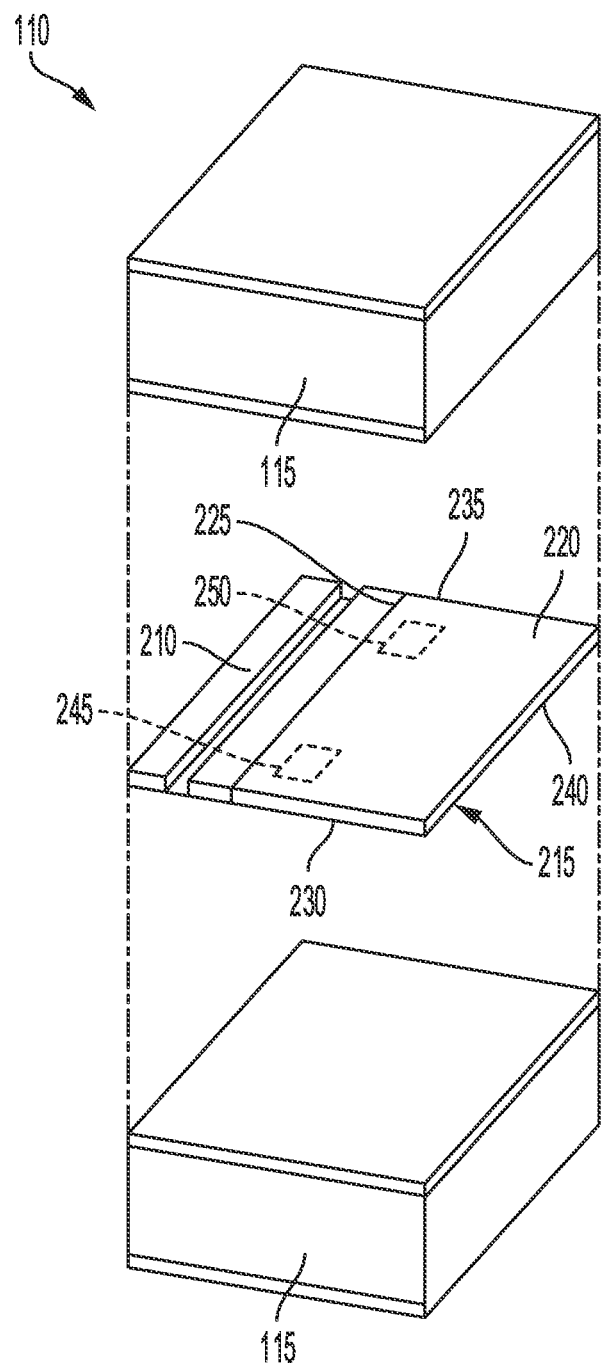
FIG. 2C depicts an isometric view of an example of top and bottom battery modules of a battery pack in an electric vehicle.

FIGS. 2B and 2C depict example battery modules 115 in the battery pack 110. The battery modules 115 can each include a plurality of battery cells 120. The battery modules 115 can be disposed within the housing 205 of the battery pack 110. The battery modules 115 can include battery cell 120 that are cylindrical cells, pouch cells, or prismatic cells, for example. The battery module 115 can operate as a modular unit of battery cells. For example, a battery module 115 can collect current or electrical power from the battery cells that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule and a bottom submodule, with an apparatus 215 (e.g., a cold plate) as depicted in between the top submodule and the bottom submodule. Each submodule can be referred to as a battery module 115 itself, or the top and bottom submodules collectively can be referred to as a single battery module 115. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells.

The battery pack 110 can include any number of apparatuses 215. One or more apparatuses 215, e.g., a cold plate, can be provided, arranged, situated, or otherwise disposed per battery pack 110 or one or more apparatuses 215 per battery module 115. For example, as depicted in FIG. 2C, there can be one apparatus 215 disposed between a single top battery module 115 and a single bottom battery module 115 in the battery pack 110. Each battery module (or submodule) 115 can be thermally coupled with a dedicated apparatus 215. The battery pack 110 can also include one apparatus 215 coupled with more than one battery module 115 (or more than two submodules 115). The apparatus 215 can be thermally coupled with the top and bottom battery modules 115 to draw heat away from the battery cells therein. The apparatus 215 can be situated, arranged, or otherwise disposed along a surface (e.g., a bottom surface) of the battery pack 110 or battery modules 115. For example, the apparatus 215 may be positioned in relation to a top submodule and a bottom submodule, such as in between the top and bottom submodules 115 (e.g., as depicted in FIG. 2B), among other possibilities. The manifold 210 can also be situated, arranged, or otherwise disposed along the surface (e.g., a bottom surface) of the battery pack 110 or battery modules 115. At least a portion of the manifold 210 can be along the same plane formed by the apparatus 215 with respect to the surface of the battery pack 110 or battery modules 115.

Arranged in relation to the battery pack 110, the apparatus 215 can be thermally coupled with the battery pack 110 or the battery module 115 to receive thermal energy or heat emitted by the battery cells in the battery module 115. The apparatus 215 can comprise a thermally conductive material. The thermally conductive material for the apparatus 215 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others. The apparatus 215 can be of any shape. The shape of the apparatus 215 can be polygonal, triangle, a square, a rectangle (e.g., as depicted), a pentagon, or a hexagon, among others. The shape of the apparatus 215 can be circular, such as a circle or oval. The apparatus 215 can be of any dimension. For example, the apparatus 215 can have a length ranging between 500-1000 mm. The apparatus 215 can have a width ranging between 100-2000 mm. The apparatus 215 can have a thickness ranging between 3-10 mm.

The apparatus 215 can include at least one surface 220 (e.g., a top surface as depicted) adjacent, facing, or flush with the surface of the battery pack 110 or one or more of the battery modules 115. The surface 220 can define or include plenums, channels, and other structures fluidly coupled with the manifold 210. The structures on the surface 220 of the apparatus 215 can draw, receive, or otherwise convey the fluid to evacuate or distribute thermal heat emitted by the battery cells from the battery modules 115 in the battery pack 110. A perimeter region of the surface 220 can be mechanically coupled with the surface (e.g., the bottom surface) of the battery pack 110 or the battery modules 115 to seal, retain, or maintain the fluid on the surface 220 of the apparatus 215. The perimeter region can correspond to an outer, boundary edge of the surface 220. The mechanically coupling between the surface 220 of the apparatus 215 and the battery pack 110 or the battery modules 115 can be, for example, a seal, such as a mechanical seal, a hermetic seal, an induction seal, a hydrostatic seal, and a bonded seal, among others.

The surface 220 of the apparatus 215 can have one or more edges and corners in reference to which the plenums, channels, and other structures can be arranged, situated, or otherwise defined. For example, the surface 220 can include at least one manifold edge 225, at least one first lateral edge 230 (e.g., a left edge), at least one second lateral edge 235 (e.g., a right edge), and at least one distal edge 240, among others. The manifold edge 225 can correspond a side of the surface 220 of the apparatus 215 proximate, adjacent, or otherwise coupled with the manifold 210. The first lateral edge 230 and the second lateral edge 235 can correspond to respective sides of the surface 220, both extending from the manifold edge 225 to the distal edge 240. The first lateral edge 230 can be opposite of the second later edge 235 The distal edge 240 can correspond to a side of the surface 220 opposite of the manifold edge 225. The surface 220 of the apparatus 215 can also have a first corner 245 (e.g., an inlet corner) and a second corner 250 (e.g., an outlet corner). The first corner 245 can correspond to a portion of the surface 220 generally between the manifold edge 225 and the first lateral edge 230. The second corner 250 can correspond to a portion of the surface 220 generally between the manifold edge 225 and the second lateral edge 235. Details regarding the arrangement and configuration of plenums, channels, and other structures of the apparatus 215 are described herein in conjunction with FIGS. 3-9.

Figure 2D:
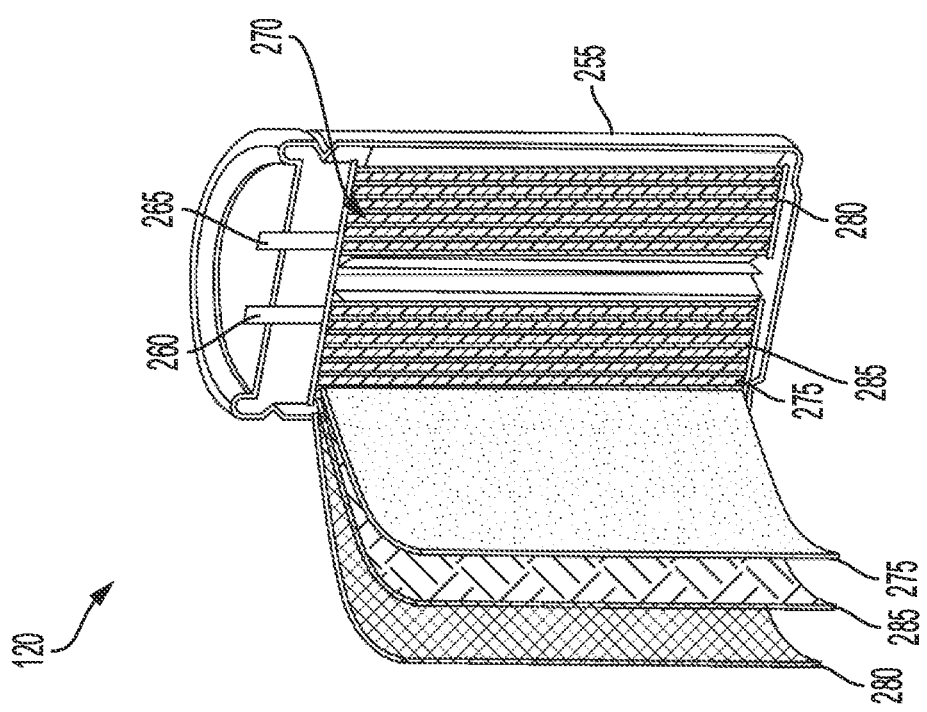
FIG. 2D depicts a cross sectional view of an example of a battery cell.

FIG. 2D depicts an example cross sectional view of a battery cell 120. Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing 255. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 255 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 260 (e.g., a positive or anode terminal) and a second polarity terminal 265 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 255 can be disposed in the battery module 115, the battery pack 110, or a battery array installed in the electric vehicle 105. The housing 255 can be of any shape, such as cylindrical with a circular (e.g., as depicted), elliptical, or ovular base, among others. The shape of the housing 255 can also be prismatic with a polygonal base, such as a triangle, a square, a rectangle, a pentagon, and a hexagon, among others.

The housing 255 of the battery cell 120 can include one or more materials with various electrical conductivity or thermal conductivity, or a combination thereof. The electrically conductive and thermally conductive material for the housing 255 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 255 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 275, which can be disposed within the cavity 270 defined by the housing 255. The anode layer 275 can receive electrical current into the battery cell 120 and output electrons during the operation of the battery cell 120 (e.g., charging or discharging of the battery cell 120). The anode layer 275 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated).

The battery cell 120 can include at least one cathode layer 280 (e.g., a composite cathode layer compound cathode layer, a compound cathode, a composite cathode, or a cathode). The cathode layer 280 can be disposed within the cavity 270. The cathode layer 280 can output electrical current out from the battery cell 120 and can receive electrons during the discharging of the battery cell 120. The cathode layer 280 can also release lithium ions during the discharging of the battery cell 120. Conversely, the cathode layer 280 can receive electrical current into the battery cell 120 and can output electrons during the charging of the battery cell 120. The cathode layer 280 can receive lithium ions during the charging of the battery cell 120.

The battery cell 105 can include an electrolyte layer 285 disposed within the cavity 270. The electrolyte layer 285 can be arranged between the anode layer 275 and the cathode layer 280 to separate the anode layer 275 and the cathode layer 280. The electrolyte layer 285 can transfer ions between the anode layer 275 and the cathode layer 280. The electrolyte layer 285 can transfer cations from the anode layer 275 to the cathode layer 280 during the operation of the battery cell 120. The electrolyte layer 285 can transfer anions (e.g., lithium ions) from the cathode layer 280 to the anode layer 275 during the operation of the battery cell 120.

The electrolyte layer 285 can include or be made of a liquid electrolyte material. The liquid electrolyte material can include a lithium salt dissolved in a solvent. The lithium salt for the liquid electrolyte material for the electrolyte layer 285 can include, for example, lithium tetrafluoroborate ($LiBF_4$), lithium hexafluorophosphate ($LiPF_6$), and lithium perchlorate ($LiC_1O_4$), among others. The solvent can include, for example, dimethyl carbonate (DMC), ethylene carbonate (EC), and diethyl carbonate (DEC), among others. The electrolyte layer 285 can include or be made of a solid electrolyte material, such as a ceramic electrolyte material, polymer electrolyte material, or a glassy electrolyte material, or among others, or any combination thereof. The ceramic electrolyte material for the electrolyte layer 285 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 285 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 285 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

Figure 3:
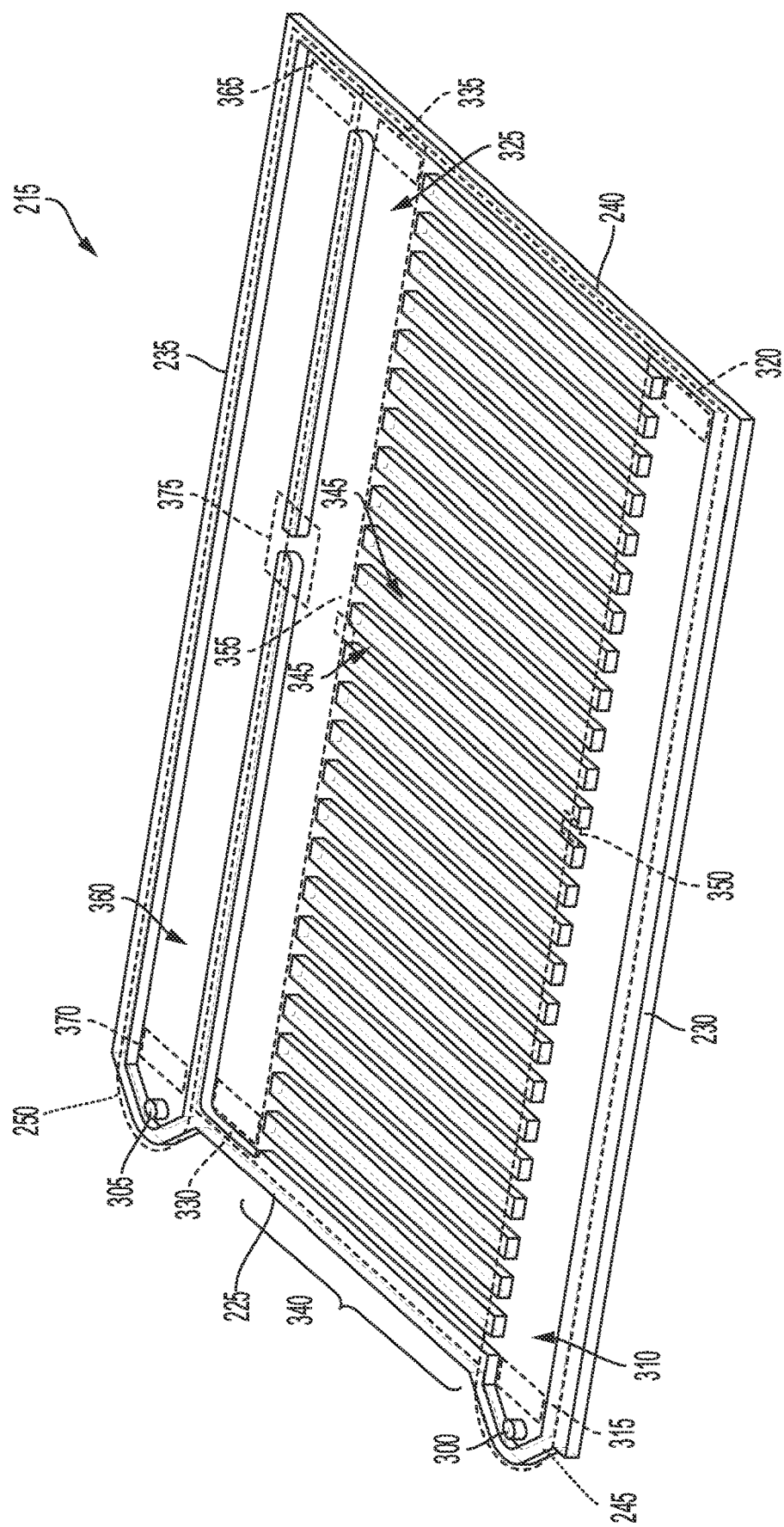
FIG. 3 depicts an isometric view of an example of an apparatus to regulate heat transfer.

FIG. 3, among others, depicts an isometric view of the apparatus 215 (e.g., a cold plate) to regulate heat transfer. The various structures defined on the apparatus 215 as depicted can be in a parallel configuration, as detailed herein below. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned at the second corner 250 along the manifold edge 225 (e.g., as depicted) of the surface 220 of the apparatus 215.

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others. The first plenum 310 can have a length similar (e.g., within 15%) to the length of the overall apparatus 215 (e.g., minus the allowance for external walls). The first plenum 310 can have a width ranging between 40-80 mm. The first plenum 310 can have a depth ranging between 1-8 mm.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have include at least one second plenum 325. The second plenum 325 can correspond to a linear depression, trench, or a trough defined on the surface 220 and spanning from the manifold edge 225 to the distal edge 240 along the first lateral edge 230. The depression defining the second plenum 325 can be substantially parallel (e.g., within 15% deviation) to the second lateral edge 235 of the surface 220 of the apparatus 215, at an offset distance from the second lateral edge 235. The depression corresponding to the second plenum 325 can be of any shape, such as a prismatic hollowing into the surface 220 with a triangular, rectangular (e.g., as depicted), pentagonal, elliptical, and circular base, among others. The second plenum 325 can have a length ranging between similar (e.g., within 15%) to the length of the overall apparatus 215 (e.g., minus the allowance for external walls). The length of the second plenum 325 can be less than, substantially equal (e.g., within 15% deviation) to, or greater than the length of the first plenum 310. The second plenum 325 can have a width ranging between 40-80 mm. The width of the second plenum 325 can be less than, substantially equal (e.g., within 15% deviation) to, or greater than the width of the plenums (e.g., the first plenum 310. The second plenum 325 can have a depth ranging between 1-8 mm. The depth of the second plenum 325 can be less than, substantially equal (e.g., within 15% deviation) to, or greater than the depth of the first plenum 310.

The second plenum 325 can be fluidly coupled with the first plenum 310 to draw, transfer, or otherwise convey the fluid from the first plenum 310. The second plenum 325 can be indirectly coupled with the first plenum 310 via one or more other structures defined on the surface 220 of the apparatus 215. The second plenum 325 can be substantially parallel (e.g., within 15% deviation) with the first plenum 310 spanning along the surface 220 from the manifold edge 225 to the distal edge 240. The second plenum 325 can have at least one initial end 330 and at least one terminal end 335. The initial end 330 can correspond to an open edge of the second plenum 325 situated, arranged, or positioned toward the manifold edge 225 of the surface 220. The terminal end 335 can correspond to an open edge of the second plenum 325 opposite of the initial end 330, and can be situated, arranged, or positioned toward the distal edge 240 of the surface 220. The second plenum 325 can take in, accept, or otherwise receive the fluid from the first plenum 310 via one or more other structures defined on the surface 220 of the apparatus 215. The second plenum 325 can receive individual volumes of the fluid between the initial end 330 and the terminal end 335. The second plenum 325 can direct, route, or otherwise convey the received fluid toward the terminal end 335. The second plenum 325 can deliver, circulate, or otherwise distribute volumes of the fluid to other structures defined on the apparatus 215.

The apparatus 215 can define or have at least one channel region 340. The channel region 340 can correspond to a portion of the surface 220 of the apparatus 215 between the first plenum 310 and the second plenum 325 along one axis. The channel region 340 can correspond to a portion of the surface 220 of the apparatus 215 between the manifold edge 225 and the distal edge 240 along another axis, (e.g., substantially orthogonal axis, within 15% deviation). The channel region 340 can be bounded by the first plenum 310, the second plenum 325, the manifold edge 225, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have a set of channels 345. The set of channels 345 can be defined in the channel region 340 of the surface 220 of the apparatus 215. Each channel 345 can correspond to a linear depression, trench, or trough defined spanning across the surface 220 in the channel region 340 from the first plenum 310 to the second plenum 325. Each channel 345 can be substantially orthogonal (e.g., within 15% deviation) with the first plenum 310 or the second plenum 325. The set of channels 345 can be parallel or substantially parallel (e.g., within 15% deviation) with one another. The apparatus 215 can include any number of channels for the set of channels 345, and can be less than 5, between 5-30, or more than 30, among others. The linear depression corresponding to each channel 345 can be of any shape, such as a prismatic hollowing into the surface 220 with a triangular, rectangular (e.g., as depicted), pentagonal, elliptical, and circular base, among others. Each channel 345 can have a length to bridge the space between the first plenum 310 and the second plenum 325. Each channel 345 can have a width ranging between 5-20 mm. The width of the channel 345 can differ from the widths of the plenums (e.g., the first plenum 310 and the second plenum 325). For example, at least one channel 345 can have a width be less than or equal to the width of at least one of the plenums. Conversely, at least one channel 345 can have a width be greater than or the width of at least one of the plenums. The widths of the channels 345 can also differ from one another. Each channel 345 can have a depth ranging between 1-8 mm. The depth of the channels 345 can be less than, substantially equal (e.g., within 15% deviation) to, or greater than the depths of the first plenum 310 or the second plenum 325.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 350 and at least one terminal end 355. The initial end 350 can correspond to an edge of the channel 345 proximate to, abutting, or connected with the first plenum 310. The initial end 350 can be fluidly coupled with the first plenum 310 to accept, draw, or receive the fluid therefrom. The terminal end 355 can correspond to an edge of the channel 345 opposite to the initial end 350. The terminal end 355 can be proximate to, abutting, or connected with the second plenum 325. The terminal end 355 can be fluidly coupled with the second plenum 325. Each channel 345 can accept, draw, or otherwise receive the fluid from the first plenum 310 via the initial end 350. Each channel 345 can carry, pass, or otherwise convey the fluid from the first plenum 310 received via the initial end 350 to the second plenum 325. Each channel 345 can evacuate, drain, or otherwise release the fluid to the second plenum 325 via the terminal end 355. While individual sub-volumes of fluid can be distributed to the respective channels 345, these sub-volumes can be considered as part of the same, overall fluid. These volumes conveyed through the channels 345 can be referred to the fluid.

The apparatus 215 can define or have at least one third plenum 360. The third plenum 360 can correspond to a linear depression, trench, or a trough defined on the surface 220 and spanning from the manifold edge 225 to the distal edge 240 along the second lateral edge 235. The depression defining the third plenum 360 can be substantially parallel (e.g., within 15% deviation) to the second lateral edge 235 of the surface 220 of the apparatus 215. The depression corresponding to the third plenum 360 can be of any shape, such as a prismatic hollowing into the surface 220 with a triangular, rectangular (e.g., as depicted), pentagonal, elliptical, and circular base, among others. The third plenum 360 can have a length ranging between similar (e.g., within 15%) to the length of the overall apparatus 215 (e.g., minus the allowance for external walls). The length of the third plenum 360 can be less than, substantially equal (e.g., within 15% deviation) to, or greater than the length of the first plenum 310, the second plenum 325, or the channels 345. The third plenum 360 can have a width ranging between 40-80 mm. The width of the third plenum 360 can be less than, substantially equal (e.g., within 15% deviation) to, or greater than the width of the first plenum 310, the second plenum 325, or the channels 345. The third plenum 360 can have a depth ranging between 1-8 mm. The length of the third plenum 360 can be less than, substantially equal (e.g., within 15% deviation) to, or greater than the length of the first plenum 310, the second plenum 325, or the channels 345.

The third plenum 360 can be fluidly coupled with the outlet 305 to evacuate, drain, or otherwise release the fluid from the one or more other structures on the surface 220 of the apparatus 215. The third plenum 360 can have at least one initial end 365 and at least one terminal end 370. The initial end 365 can correspond to an open edge of the third plenum 360 can be situated, arranged, or positioned toward the distal edge 240 of the surface 220. The initial end 365 can be proximate to, abutting, otherwise connected with the terminal end 335 of the second plenum 325. The initial end 365 of the third plenum 360 can be fluidly coupled with the second plenum 325 via the terminal end 335. The terminal end 370 can correspond to an open edge of the third plenum 360 opposite of the initial end 365 and fluidly coupled with the outlet 305 at the second corner 250. The terminal end 370 can be situated, arranged, or positioned toward the manifold edge 225 of the surface 220. The initial end 365 of the third plenum 360 can draw, accept, or otherwise receive the fluid via the terminal end 335 of the second plenum 325. The third plenum 360 can direct, route, or otherwise convey the fluid from the initial end 365 via the terminal end 370 along the second lateral edge 235 to the outlet 305 to release the fluid from the surface 220 of the apparatus 215.

The apparatus 215 can define or have at least one bypass 375. The bypass 375 can correspond to a linear depression, opening, or a aperture defined on the surface 220 spanning between the second plenum 325 and the third plenum 360. For example, the bypass 375 can be defined by an opening in the wall on the surface 220 defined between the second plenum 325 and the third plenum 360. The bypass 375 can be substantially orthogonal (e.g., within 15% deviation) with the second plenum 325 or the third plenum 360. The depression corresponding to the bypass 375 can be of any shape, such as a prismatic hollowing into the surface 220 with a triangular, rectangular (e.g., as depicted), pentagonal, elliptical, and circular base, among others. The bypass 375 can have a length corresponding to a separation between the second plenum 325 and the third plenum 360, and can ranging between 5-20 mm. The bypass 375 can have a width ranging between 5-20 mm. The width of the bypass 375 can be less than, substantially equal (e.g., within 15% deviation) to, or greater than the width of the plenums (e.g., the first plenum 310, the second plenum 325, or the third plenum 360) or the channel 345. The bypass 375 can have a depth ranging between 1-8 mm. The depth of the bypass 375 can less than, substantially equal (e.g., within 15% deviation) to, or greater than the depth of the plenums (e.g., the first plenum 310, the second plenum 325, or the third plenum 360) or the channel 345, The bypass 375 can be arranged, situated, or otherwise positioned at an offset distance relative to the outlet 305, the initial end 330, the terminal end 335, the initial end 365, or the terminal end 370, among others. The offset distance for the placement of the bypass 375 can range between 20-80% of the distance of the overall apparatus 215 relative to the manifold edge. The bypass 375 can be positioned relative to the initial end 330 and the terminal end 335 of the second plenum 325 or the initial end 365 and the terminal end 370 of the third plenum 360. The bypass 375 can be positioned between 20-80% of the length of the second plenum 325 defined between the initial end 330 and the terminal end 335. By extension, the bypass 375 can be situated between of the length of the third plenum 360 between the initial end 365 and the terminal end 370. For example, as depicted, the bypass 375 can be situated in the center third of the wall defined between the second plenum 325 and the third plenum 360 relative to the manifold edge 225. The bypass 375 can be positioned in the closest third on the wall between the second plenum 325 and the third plenum 360 relative to the manifold edge 225. The bypass 375 can be positioned on the farthest third on the wall between the second plenum 325 and the third plenum 360 relative to the manifold edge 225.

The bypass 375 can fluidly couple the second plenum 325 with the third plenum 360. The coupling by the bypass 375 can be separate and independent from the coupling between the terminal end 335 of the second plenum 325 and the initial end 365 of the third plenum 360. The bypass 375 can carry, pass, or otherwise convey at least a sub-volume of the fluid collected in the second plenum 325 to the third plenum 360. The volume of the fluid conveyed via the bypass 375 to the third plenum 360 can differ from the volume of fluid conveyed via the terminal end 335 of the second plenum 325 to the third plenum 360. For example, the bypass 375 can be configured to transfer 10-90% of the fluid and the terminal end 335 of the second plenum 325 can be configured to transfer the remaining percentage of the fluid. The sub-volume volume of the fluid conveyed via the bypass 375 can be considered as part of the same, overall fluid distributed throughout the structures of the apparatus 215, and can be referred to also as the fluid.

The bypass 375 can be arranged, situated, or otherwise positioned relative to at least one of the set of channels 345. The bypass 375 can be aligned with at least one channel 345. For example, the terminal end 355 of one of the channels 345 can be substantially aligned (e.g., within 15% deviation) with the opening defined by the bypass 375. The bypass 375 can be not aligned with one or more channels 345 defined in the channel region 340. For instance, at least one channel 345 can be aligned between the bypass 375 and the initial end 330 of the second plenum 325. At least one other channel 345 (e.g., an adjacent or neighboring channel 345) can be aligned between the bypass 375 and the terminal end 335 of the second plenum 325. The respective terminal ends 355 of the channels 345 can be oblique or aslant from the opening defined by the bypass 375, and can be aligned with the wall defined between the second plenum 325 and the third plenum 360.

Figure 4:
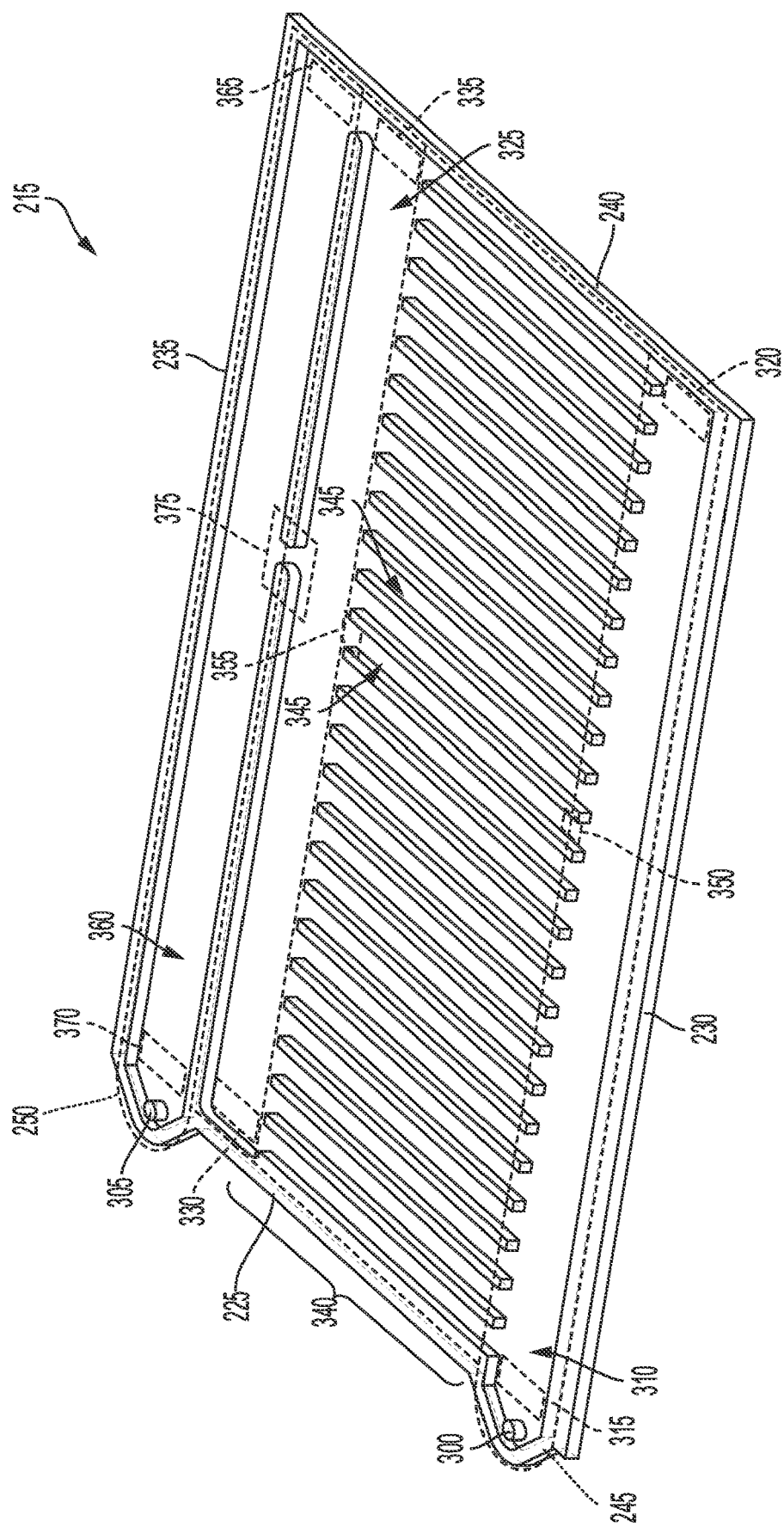
FIG. 4 depicts an isometric view of an example of an apparatus to regulate heat transfer.

FIG. 4, among others, depicts an isometric view of the apparatus 215 (e.g., a cold plate) to regulate heat transfer. The apparatus 215 depicted in FIG. 4 may be similar in structure to the apparatus 215 depicted in FIG. 3, but with wider channel widths. The various structures defined on the apparatus 215 as depicted can be in a parallel configuration, as detailed herein below. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned at the second corner 250 along the manifold edge 225 (e.g., as depicted) of the surface 220 of the apparatus 215.

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have include at least one second plenum 325. The second plenum 325 can correspond to a linear depression, trench, or a trough defined on the surface 220 and spanning from the manifold edge 225 to the distal edge 240 along the first lateral edge 230. The depression defining the second plenum 325 can be substantially parallel (e.g., within 15% deviation) to the second lateral edge 235 of the surface 220 of the apparatus 215, at an offset distance from the second lateral edge 235. The depression corresponding to the second plenum 325 can be of any shape, such as a prismatic hollowing into the surface 220 with a triangular, rectangular (e.g., as depicted), pentagonal, elliptical, and circular base, among others.

The second plenum 325 can be fluidly coupled with the first plenum 310 to draw, transfer, or otherwise convey the fluid from the first plenum 310. The second plenum 325 can be indirectly coupled with the first plenum 310 via one or more other structures defined on the surface 220 of the apparatus 215. The second plenum 325 can be substantially parallel (e.g., within 15% deviation) with the first plenum 310 spanning along the surface 220 from the manifold edge 225 to the distal edge 240. The second plenum 325 can have at least one initial end 330 and at least one terminal end 335. The initial end 330 can correspond to an open edge of the second plenum 325 situated, arranged, or positioned toward the manifold edge 225 of the surface 220. The terminal end 335 can correspond to an open edge of the second plenum 325 opposite of the initial end 330, and can be situated, arranged, or positioned toward the distal edge 240 of the surface 220. The second plenum 325 can take in, accept, or otherwise receive the fluid from the first plenum 310 via one or more other structures defined on the surface 220 of the apparatus 215. The second plenum 325 can receive individual volumes of the fluid between the initial end 330 and the terminal end 335. The second plenum 325 can direct, route, or otherwise convey the received fluid toward the terminal end 335. The second plenum 325 can deliver, circulate, or otherwise distribute volumes of the fluid to other structures defined on the apparatus 215.

The apparatus 215 can define or have at least one channel region 340. The channel region 340 can correspond to a portion of the surface 220 of the apparatus 215 between the first plenum 310 and the second plenum 325 along one axis. The channel region 340 can correspond to a portion of the surface 220 of the apparatus 215 between the manifold edge 225 and the distal edge 240 along another axis, (e.g., substantially orthogonal axis, within 15% deviation). The channel region 340 can be bounded by the first plenum 310, the second plenum 325, the manifold edge 225, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have set of channels 345. The set of channels 345 can be defined in the channel region 340 of the surface 220 of the apparatus 215. Each channel 345 can correspond to a linear depression, trench, or trough defined spanning across the surface 220 in the channel region 340 from the first plenum 310 to the second plenum 325. Each channel 345 can be substantially orthogonal (e.g., within 15% deviation) with the first plenum 310 or the second plenum 325. The set of channels 345 can be parallel or substantially parallel (e.g., within 15% deviation) with one another. The apparatus 215 can include any number of channels for the set of channels 345, ranging between and can be less than 5, between 5-30, and more than 30, among others. The linear depression corresponding to each channel 345 can be of any shape, such as a prismatic hollowing into the surface 220 with a triangular, rectangular (e.g., as depicted), pentagonal, elliptical, and circular base, among others. Relative to the channels 345 as depicted in FIG. 3, the channels 345 as depicted in FIG. 4 can have a greater width.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 350 and at least one terminal end 355. The initial end 350 can correspond to an edge of the channel 345 proximate to, abutting, or connected with the first plenum 310. The initial end 350 can be fluidly coupled with the first plenum 310 to accept, draw, or receive the fluid therefrom. The terminal end 355 can correspond to an edge of the channel 345 opposite to the initial end 350. The terminal end 355 can be proximate to, abutting, or connected with the second plenum 325. The terminal end 355 can be fluidly coupled with the second plenum 325. Each channel 345 can accept, draw, or otherwise receive the fluid from the first plenum 310 via the initial end 350. Each channel 345 can carry, pass, or otherwise convey the fluid from the first plenum 310 received via the initial end 350 to the second plenum 325. Each channel 345 can evacuate, drain, or otherwise release the fluid to the second plenum 325 via the terminal end 355. While individual sub-volumes of fluid can be distributed to the respective channels 345, these sub-volumes can be considered as part of the same, overall fluid. These volumes conveyed through the channels 345 can be referred to the fluid.

The apparatus 215 can define or have a third plenum 360. The third plenum 360 can correspond to a linear depression, trench, or a trough defined on the surface 220 and spanning from the manifold edge 225 to the distal edge 240 along the second lateral edge 235. The depression defining the third plenum 360 can be substantially parallel (e.g., within 15% deviation) to the second lateral edge 235 of the surface 220 of the apparatus 215. The depression corresponding to the third plenum 360 can be of any shape, such as a prismatic hollowing into the surface 220 with a triangular, rectangular (e.g., as depicted), pentagonal, elliptical, and circular base, among others.

The third plenum 360 can be fluidly coupled with the outlet 305 to evacuate, drain, or otherwise release the fluid from the one or more other structures on the surface 220 of the apparatus 215. The third plenum 360 can have at least one initial end 365 and at least one terminal end 370. The initial end 365 can correspond to an open edge of the third plenum 360 can be situated, arranged, or positioned toward the distal edge 240 of the surface 220. The initial end 365 can be proximate to, abutting, otherwise connected with the terminal end 335 of the second plenum 325. The initial end 365 of the third plenum 360 can be fluidly coupled with the second plenum 325 via the terminal end 335. The terminal end 370 can correspond to an open edge of the third plenum 360 opposite of the initial end 365 and fluidly coupled with the outlet 305 at the second corner 250. The terminal end 370 can be situated, arranged, or positioned toward the manifold edge 225 of the surface 220. The initial end 365 of the third plenum 360 can draw, accept, or otherwise receive the fluid via the terminal end 335 of the second plenum 325. The third plenum 360 can direct, route, or otherwise convey the fluid from the initial end 365 via the terminal end 370 along the second lateral edge 235 to the outlet 305 to release the fluid from the surface 220 of the apparatus 215.

The apparatus 215 can define or have at least one bypass 375. The bypass 375 can correspond to a linear depression, trench, or a trough defined on the surface 220 spanning between the second plenum 325 and the third plenum 360. For example, the bypass 375 can correspond to a divot in the wall on the surface 220 defined between the second plenum 325 and the third plenum 360. The depression defining the bypass 375 can be substantially orthogonal (e.g., within 15% deviation) with the second plenum 325 or the third plenum 360. The depression corresponding to the bypass 375 can be of any shape, such as a prismatic hollowing into the surface 220 with a triangular, rectangular (e.g., as depicted), pentagonal, elliptical, and circular base, among others.

The bypass 375 can be arranged, situated, or otherwise positioned at an offset distance relative to the outlet 305, the initial end 330, the terminal end 335, the initial end 365, or the terminal end 370, among others. The offset distance for the placement of the bypass 375 can range between 20-80% of the distance of the overall apparatus 215 relative to the manifold edge. The bypass 375 can be positioned relative to the initial end 330 and the terminal end 335 of the second plenum 325 or the initial end 365 and the terminal end 370 of the third plenum 360. The bypass 375 can be positioned between 20-80% of the length of the second plenum 325 defined between the initial end 330 and the terminal end 335. By extension, the bypass 375 can be situated between 20-80% of the length of the third plenum 360 between the initial end 365 and the terminal end 370. For example, as depicted, the bypass 375 can be situated in the center third of the wall defined between the second plenum 325 and the third plenum 360 relative to the manifold edge 225. The bypass 375 can be positioned in the closest third on the wall between the second plenum 325 and the third plenum 360 relative to the manifold edge 225. The bypass 375 can be positioned on the farthest third on the wall between the second plenum 325 and the third plenum 360 relative to the manifold edge 225.

The bypass 375 can fluidly couple the second plenum 325 with the third plenum 360. The coupling by the bypass 375 can be separate and independent from the coupling between the terminal end 335 of the second plenum 325 and the initial end 365 of the third plenum 360. The bypass 375 can carry, pass, or otherwise convey at least a sub-volume of the fluid collected in the second plenum 325 to the third plenum 360. The volume of the fluid conveyed via the bypass 375 to the third plenum 360 can differ from the volume of fluid conveyed via the terminal end 335 of the second plenum 325 to the third plenum 360. For example, the bypass 375 can be configured to transfer 10-90% of the fluid and the terminal end 335 of the second plenum 325 can be configured to transfer the remaining percentage of the fluid. The sub-volume volume of the fluid conveyed via the bypass 375 can be considered as part of the same, overall fluid distributed throughout the structures of the apparatus 215, and can be referred to also as the fluid.

The bypass 375 can be arranged, situated, or otherwise positioned relative to at least one of the set of channels 345. The bypass 375 can be aligned with at least one channel 345. For example, the terminal end 355 of one of the channels 345 can be substantially aligned (e.g., within 15% deviation) with the opening defined by the bypass 375. The bypass 375 can be not aligned with one or more channels 345 defined in the channel region 340. For instance, at least one channel 345 can be aligned between the bypass 375 and the initial end 330 of the second plenum 325. At least one other channel 345 (e.g., an adjacent or neighboring channel 345) can be aligned between the bypass 375 and the terminal end 335 of the second plenum 325. The respective terminal ends 355 of the channels 345 can be oblique or aslant from the opening defined by the bypass 375, and can be aligned with the wall defined between the second plenum 325 and the third plenum 360.

Figure 5:
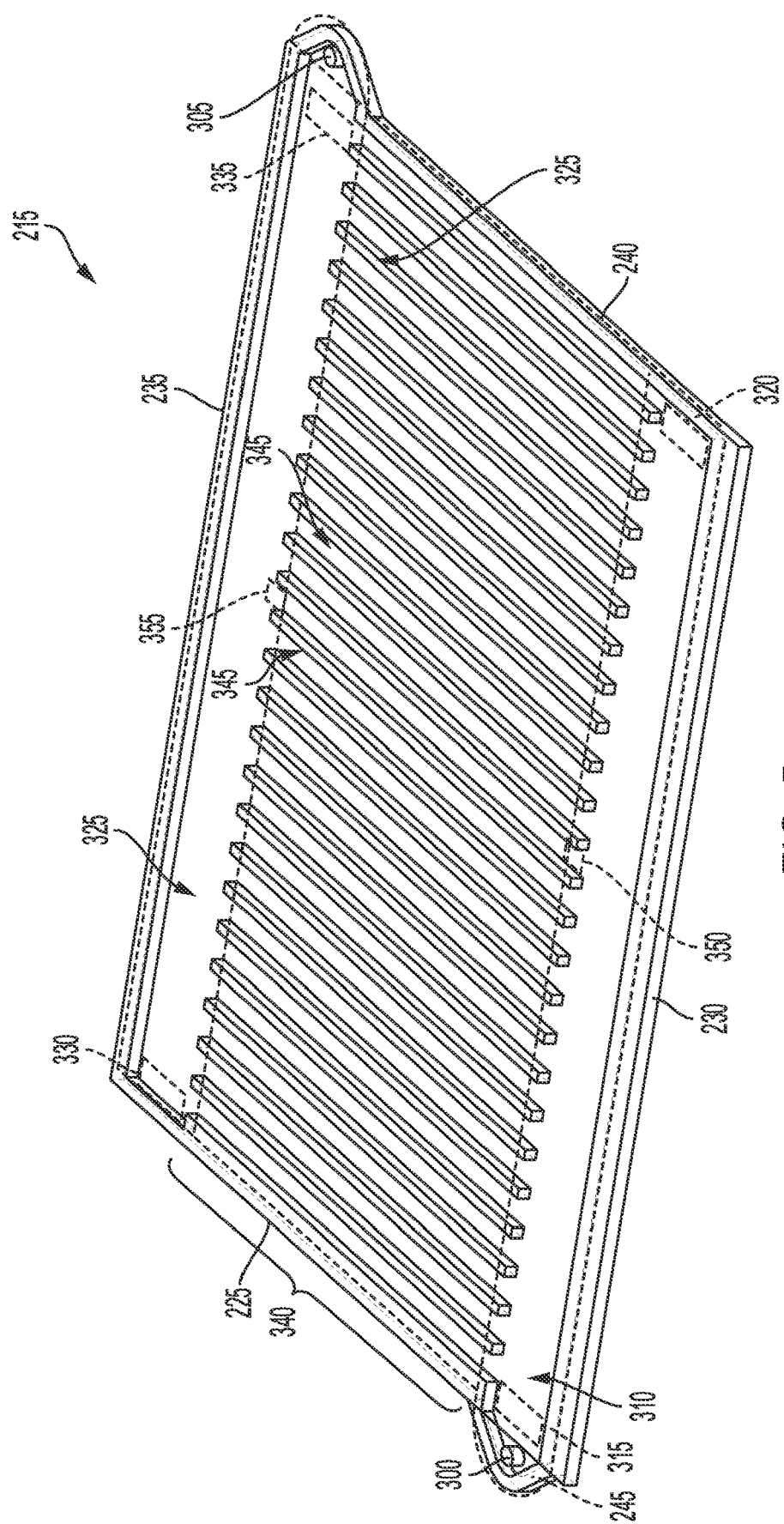
FIG. 5 depicts an isometric view of an example of an apparatus to regulate heat transfer.

FIG. 5, among others, depicts an isometric view of the apparatus 215 (e.g., a cold plate) to regulate heat transfer. The apparatus 215 depicted in FIG. 5 may be similar in structure to the apparatus 215 depicted in FIGS. 3 and 4, but lacking an intermediary plenum and having an outlet plenum in a different direction. The various structures defined on the apparatus 215 as depicted can be in a parallel configuration, as detailed herein below. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the distal edge 240 For example, the outlet 305 can be a port positioned over the manifold 210 to release the fluid into another manifold 210 from the surface 220 of the apparatus 215. The outlet 305 can be arranged, situated, or otherwise positioned at the distal edge 240 (e.g., as depicted) of the surface 220 of the apparatus 215. The outlet 305 can be arranged, situated, or otherwise positioned on a corner generally, diagonal from the first corner 245 (e.g., as depicted).

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have include at least one second plenum 325. The second plenum 325 can correspond to a linear depression, trench, or a trough defined on the surface 220 and spanning from the manifold edge 225 to the distal edge 240 along the second lateral edge 235. The depression defining the second plenum 325 can be substantially parallel (e.g., within 15% deviation) to the second lateral edge 235 of the surface 220 of the apparatus 215, along the first lateral edge 230. The depression corresponding to the second plenum 325 can be of any shape, such as a prismatic hollowing into the surface 220 with a triangular, rectangular (e.g., as depicted), pentagonal, elliptical, and circular base, among others. The second plenum 325 can have an orientation opposite of the first plenum 310.

The second plenum 325 can be fluidly coupled with the first plenum 310 to draw, transfer, or otherwise convey the fluid from the first plenum 310. The second plenum 325 can be indirectly coupled with the first plenum 310 via one or more other structures defined on the surface 220 of the apparatus 215. The second plenum 325 can be substantially parallel (e.g., within 15% deviation) with the first plenum 310 spanning along the surface 220 from the manifold edge 225 to the distal edge 240. The second plenum 325 can have at least one initial end 330 and at least one terminal end 335. The initial end 330 can correspond to an edge of the second plenum 325 situated, arranged, or positioned toward the manifold edge 225 of the surface 220. The terminal end 335 can correspond to an open edge of the second plenum 325 opposite of the initial end 330, and can be situated, arranged, or positioned toward the distal edge 240 of the surface 220. The second plenum 325 can take in, accept, or otherwise receive the fluid from the first plenum 310 via one or more other structures defined on the surface 220 of the apparatus 215. The second plenum 325 can receive individual volumes of the fluid between the initial end 330 and the terminal end 335. The second plenum 325 can direct, route, or otherwise convey the received fluid toward the terminal end 335 in to the outlet 305.

The apparatus 215 can define or have at least one channel region 340. The channel region 340 can correspond to a portion of the surface 220 of the apparatus 215 between the first plenum 310 and the second plenum 325 along one axis. The channel region 340 can correspond to a portion of the surface 220 of the apparatus 215 between the manifold edge 225 and the distal edge 240 along another axis, (e.g., substantially orthogonal axis, within 15% deviation). The channel region 340 can be bounded by the first plenum 310, the second plenum 325, the manifold edge 225, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have set of channels 345. The set of channels 345 can be defined in the channel region 340 of the surface 220 of the apparatus 215. Each channel 345 can correspond to a linear depression, trench, or trough defined spanning across the surface 220 in the channel region 340 from the first plenum 310 to the second plenum 325. Each channel 345 can be substantially orthogonal (e.g., within 15% deviation) with the first plenum 310 or the second plenum 325. The set of channels 345 can be parallel or substantially parallel (e.g., within 15% deviation) with one another. The apparatus 215 can include any number of channels for the set of channels 345, ranging between and can be less than 5, between 5-30, and more than 30, among others. The linear depression corresponding to each channel 345 can be of any shape, such as a prismatic hollowing into the surface 220 with a triangular, rectangular (e.g., as depicted), pentagonal, elliptical, and circular base, among others. Relative to the channels 345 as depicted in FIGS. 3 and 4, the channels 345 as depicted in FIG. 5 can have a different width.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 350 and at least one terminal end 355. The initial end 350 can correspond to an edge of the channel 345 proximate to, abutting, or connected with the first plenum 310. The initial end 350 can be fluidly coupled with the first plenum 310 to accept, draw, or receive the fluid therefrom. The terminal end 355 can correspond to an edge of the channel 345 opposite to the initial end 350. The terminal end 355 can be proximate to, abutting, or connected with the second plenum 325. The terminal end 355 can be fluidly coupled with the second plenum 325. Each channel 345 can accept, draw, or otherwise receive the fluid from the first plenum 310 via the initial end 350. Each channel 345 can carry, pass, or otherwise convey the fluid from the first plenum 310 received via the initial end 350 to the second plenum 325. Each channel 345 can evacuate, drain, or otherwise release the fluid to the second plenum 325 via the terminal end 355. While individual sub-volumes of fluid can be distributed to the respective channels 345, these sub-volumes can be considered as part of the same, overall fluid. These volumes conveyed through the channels 345 can be referred to the fluid.

Figure 6:
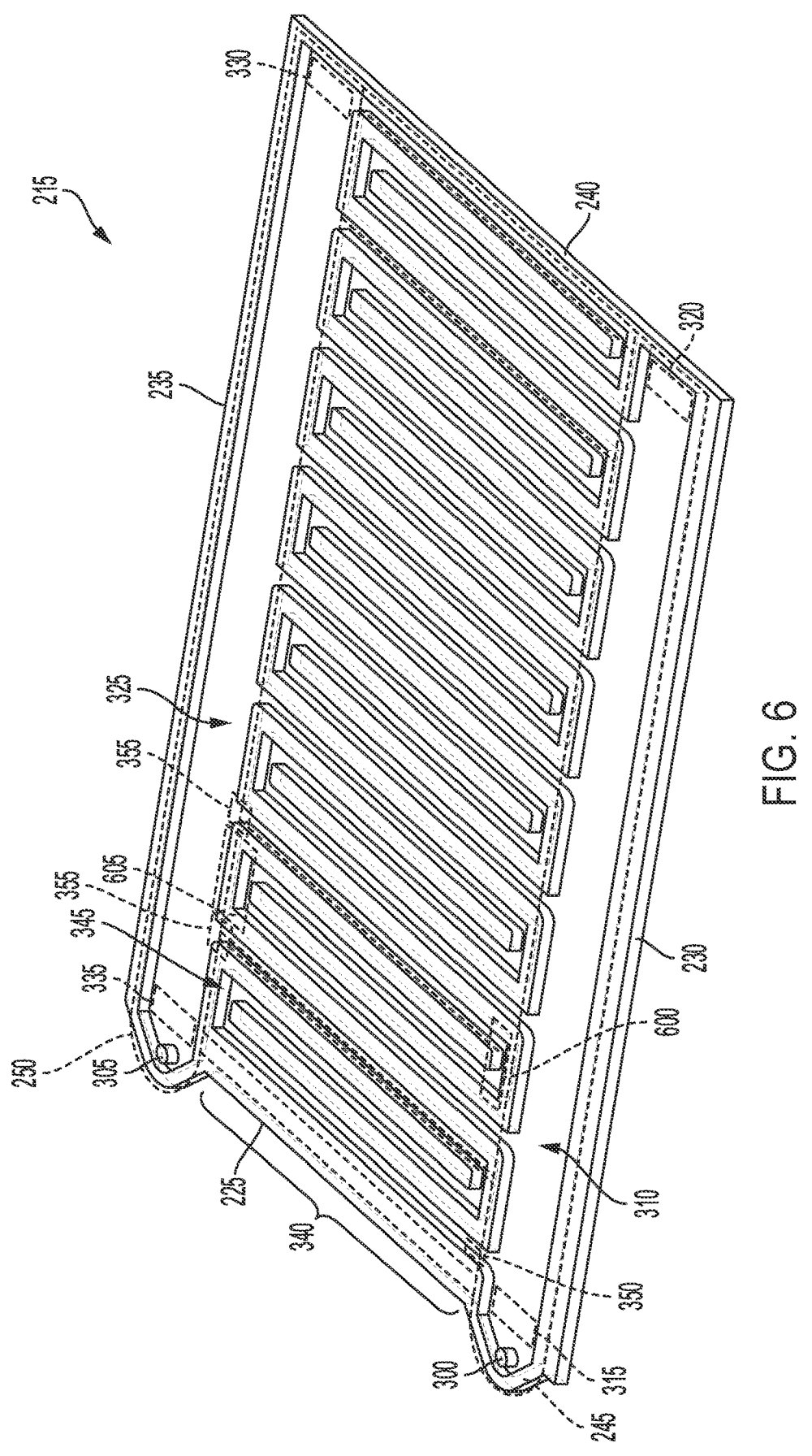

FIG. 6, among others, depicts an isometric view of the apparatus 215 (e.g., a cold plate) to regulate heat transfer. The various structures defined on the apparatus 215 as depicted can be in a hybrid configuration, as detailed herein below. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned at the second corner 250 along the manifold edge 225 (e.g., as depicted) of the surface 220 of the apparatus 215.

The apparatus 215 can define or have at least one first plenum 310. The first plenum 310 can correspond to a linear depression, trench, or trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have at least one second plenum 325. The second plenum 325 can correspond to a linear depression, trench, or a trough defined on the surface 220 and spanning from the manifold edge 225 to the distal edge 240 along the second lateral edge 235. The depression defining the second plenum 325 can be substantially parallel (e.g., within 15% deviation) to the second lateral edge 235 of the surface 220 of the apparatus 215. The depression corresponding to the second plenum 325 can be of any shape, such as a prismatic hollowing into the surface 220 with a triangular, rectangular (e.g., as depicted), pentagonal, elliptical, and circular base, among others.

The second plenum 325 can be fluidly coupled with the outlet 305 to evacuate, drain, or otherwise release the fluid from the one or more other structures on the surface 220 of the apparatus 215. The second plenum 325 can be indirectly coupled with the first plenum 310 via one or more other structures defined on the surface 220 of the apparatus 215. The second plenum 325 can have at least one initial end 330 and at least one terminal end 335. The initial end 330 can correspond to an open edge of the second plenum 325 can be situated, arranged, or positioned toward the distal edge 240 of the surface 220. The terminal end 335 can correspond to an open edge of the second plenum 325 opposite of the initial end 330 and fluidly coupled with the outlet 305 at the second corner 250. The terminal end 335 can be situated, arranged, or positioned toward the manifold edge 225 of the surface 220. The second plenum 325 can draw, accept, or otherwise receive the fluid along a side between the initial end 330 and the terminal end 335. The second plenum 325 can direct, route, or otherwise convey the fluid to the terminal end 335 along the second lateral edge 235 to the outlet 305 to release the fluid from the surface 220 of the apparatus 215.

The apparatus 215 can define or have at least one channel region 340. The channel region 340 can correspond to a portion of the surface 220 of the apparatus 215 between the first plenum 310 and the second plenum 325 along one axis. The channel region 340 can correspond to a portion of the surface 220 of the apparatus 215 between the manifold edge 225 and the distal edge 240 along another axis, (e.g., substantially orthogonal axis, within 15% deviation). The channel region 340 can be bounded by the first plenum 310, the second plenum 325, the manifold edge 225, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have a set of channels 345. The set of channels 345 can be defined in the channel region 340 of the surface 220 of the apparatus 215. Each channel 345 can correspond to a depression, trench, or trough defined spanning across a portion of the surface 220 in the channel region 340 from the first plenum 310 to the second plenum 325. The depression corresponding to the channel 345 can meander, traverse, or span in a path of any form, such as circuitous, meandering, serpentine (e.g., as depicted), winding, or zigzagging, among others or any combination thereof. The apparatus 215 can include any number of channels for the set of channels 345, and can be less than 5, between 5-30, and more than 30, among others. The depression corresponding to each channel 345 can be of any shape, such as a prismatic hollowing into the surface 220 with a triangular, rectangular (e.g., as depicted), pentagonal, elliptical, and circular base, among others.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 650 and at least one terminal end 655. The initial end 650 can correspond to an edge of the channel 345 proximate to, abutting, or connected with the first plenum 310. The initial end 650 can be fluidly coupled with the first plenum 310 to accept, draw, or receive the fluid therefrom. The terminal end 655 can correspond to an edge of the channel 345 opposite to the initial end 650. The terminal end 655 can be proximate to, abutting, or connected with the second plenum 325. The terminal end 655 can be fluidly coupled with the second plenum 325. Each channel 345 can accept, draw, or otherwise receive the fluid from the first plenum 310 via the initial end 650. Each channel 345 can carry, pass, or otherwise convey the fluid from the first plenum 310 received via the initial end 650 to the second plenum 325. Each channel 345 can evacuate, drain, or otherwise release the fluid to the second plenum 325 via the terminal end 655.

Each channel 345 can also define or have at least one first turn 600 and at least one second turn 605 (e.g., a bend or curve). The first turn 600 and the second turn 605 can define the path of the respective channel 345 between the initial end 350 and the terminal end 355. Each of the turns 600 and 605 can define a set of segments for the channels 345. Each segment of the channel 345 can correspond to a generally linear depression between turns (e.g., the first turn 600 and the second turn 605), between the initial end 350 and a turn (e.g., the first turn 600), or between a turn (e.g., the second turn 605) and the terminal end 355. Each segment can be substantially parallel (e.g., within 15% deviation) with the manifold edge 225 or the distal edge 240, or substantially orthogonal (e.g., within 15% deviation) with the first plenum 310 or the second plenum 325. The channel 345 can include any number of first turns 600 and the second turns 605, and can be less than 6 (e.g., one as depicted), between 6 to 30, or more than 30, among others.

The first turn 600 and the second turn 605 can change, route, or direct the flow of the fluid through the channel 345. The first turn 600 can direct the fluid away from the second plenum 325, into a center area of the channel region 340, and toward the first plenum 310. When there are multiple instances of the first turn 600, the first instance of the first turn 600 can direct fluid received from the initial end 350 of the channel 345 toward the center area. Subsequent instances of the first turn 600 can direct the fluid from the previous second turn 605 toward the first plenum 310. Conversely, the second turn 605 can direct the fluid away from the first plenum 310, into the channel region 340, and toward the second plenum 325. When there are multiple instances of the second turn 605, the last instance of the second turn 605 can direct fluid routed by the previous first turn 600 toward the terminal end 355 of the channel 345. Prior instance of the second turn 605 can direct the fluid from the previous first turn 600 toward the second plenum 325. While individual sub-volumes of fluid can be distributed to the respective channels 345, these sub-volumes can be considered as part of the same, overall fluid. These volumes conveyed through the channels 345 can be referred to the fluid.

Figure 7:
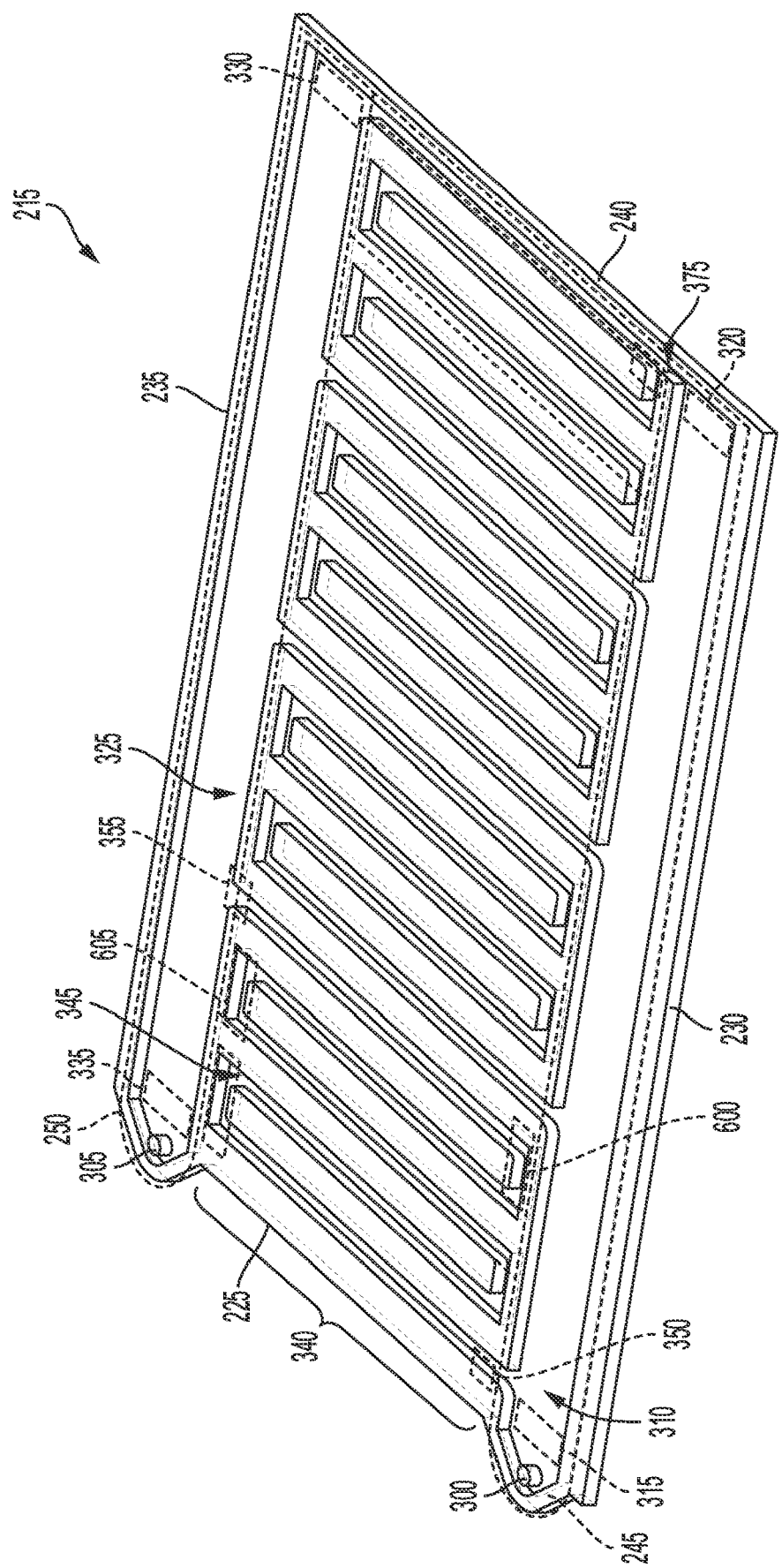
FIG. 7 depicts an isometric view of an example of an apparatus to regulate heat transfer.

FIG. 7, among others, depicts an isometric view of the apparatus 215 (e.g., a cold plate) to regulate heat transfer. The apparatus 215 depicted in FIG. 6 may be similar in structure to the apparatus 215 depicted in FIG. 6, but with additional structural components. The various structures defined on the apparatus 215 as depicted can be in a hybrid configuration, as detailed herein below. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned at the second corner 250 along the manifold edge 225 (e.g., as depicted) of the surface 220 of the apparatus 215.

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have at least one second plenum 325. The second plenum 325 can correspond to a linear depression, trench, or a trough defined on the surface 220 and spanning from the manifold edge 225 to the distal edge 240 along the second lateral edge 235. The depression defining the second plenum 325 can be substantially parallel (e.g., within 15% deviation) to the second lateral edge 235 of the surface 220 of the apparatus 215. The depression corresponding to the second plenum 325 can be of any shape, such as a prismatic hollowing into the surface 220 with a triangular, rectangular (e.g., as depicted), pentagonal, elliptical, and circular base, among others.

The second plenum 325 can be fluidly coupled with the outlet 305 to evacuate, drain, or otherwise release the fluid from the one or more other structures on the surface 220 of the apparatus 215. The second plenum 325 can be indirectly coupled with the first plenum 310 via one or more other structures defined on the surface 220 of the apparatus 215. The second plenum 325 can have at least one initial end 330 and at least one terminal end 335. The initial end 330 can correspond to an open edge of the second plenum 325 can be situated, arranged, or positioned toward the distal edge 240 of the surface 220. The terminal end 335 can correspond to an open edge of the second plenum 325 opposite of the initial end 330 and fluidly coupled with the outlet 305 at the second corner 250. The terminal end 335 can be situated, arranged, or positioned toward the manifold edge 225 of the surface 220. The second plenum 325 can draw, accept, or otherwise receive the fluid along a side between the initial end 330 and the terminal end 335. The second plenum 325 can direct, route, or otherwise convey the fluid to the terminal end 335 along the second lateral edge 235 to the outlet 305 to release the fluid from the surface 220 of the apparatus 215.

The apparatus 215 can define or have at least one channel region 340. The channel region 340 can correspond to a portion of the surface 220 of the apparatus 215 between the first plenum 310 and the second plenum 325 along one axis. The channel region 340 can correspond to a portion of the surface 220 of the apparatus 215 between the manifold edge 225 and the distal edge 240 along another axis, (e.g., substantially orthogonal axis, within 15% deviation). The channel region 340 can be bounded by the first plenum 310, the second plenum 325, the manifold edge 225, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have a set of channels 345. The set of channels 345 can be defined in the channel region 340 of the surface 220 of the apparatus 215. Each channel 345 can correspond to a depression, trench, or trough defined spanning across a portion of the surface 220 in the channel region 340 from the first plenum 310 to the second plenum 325. The depression corresponding to the channel 345 can meander, traverse, or span in a path of any form, such as circuitous, meandering, serpentine (e.g., as depicted), winding, or zigzagging, among others or any combination thereof. The apparatus 215 can include any number of channels for the set of channels 345, and can be less than 5, between 6-20, or greater than 20, among others. The depression corresponding to each channel 345 can be of any shape, such as a prismatic hollowing into the surface 220 with a triangular, rectangular (e.g., as depicted), pentagonal, elliptical, and circular base, among others. The width of the channel 345 can differ from the widths of the plenums (e.g., the first plenum 310 and the second plenum 325). For example, at least one channel 345 can have a width be less than or equal to the width of at least one of the plenums. Conversely, at least one channel 345 can have a width be greater than or the width of at least one of the plenums. The widths of the channels 345 can also differ from one another.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 350 and at least one terminal end 355. The initial end 350 can correspond to an edge of the channel 345 proximate to, abutting, or connected with the first plenum 310. The initial end 350 can be fluidly coupled with the first plenum 310 to accept, draw, or receive the fluid therefrom. The terminal end 355 can correspond to an edge of the channel 345 opposite to the initial end 350. The terminal end 355 can be proximate to, abutting, or connected with the second plenum 325. The terminal end 355 can be fluidly coupled with the second plenum 325. Each channel 345 can accept, draw, or otherwise receive the fluid from the first plenum 310 via the initial end 350. Each channel 345 can carry, pass, or otherwise convey the fluid from the first plenum 310 received via the initial end 350 to the second plenum 325. Each channel 345 can evacuate, drain, or otherwise release the fluid to the second plenum 325 via the terminal end 355.

Each channel 345 can also define or have at least one first turn 600 and at least one second turn 605 (e.g., a bend or curve). The first turn 600 and the second turn 605 can define the path of the respective channel 345 between the initial end 350 and the terminal end 355. Each of the turns 600 and 605 can define a set of segments for the channels 345. Each segment of the channel 345 can correspond to a generally linear depression between turns (e.g., the first turn 600 and the second turn 605), between the initial end 350 and a turn (e.g., the first turn 600), or between a turn (e.g., the second turn 605) and the terminal end 355. Each segment can be substantially parallel (e.g., within 15% deviation) with the manifold edge 225 or the distal edge 240, or substantially orthogonal (e.g., within 15% deviation) with the first plenum 310 or the second plenum 325. The channel 345 can include any number of first turns 600 and the second turns 605, and can be less than 6 (e.g., 2 as depicted), between 6 to 30, or more than 30, among others.

The first turn 600 and the second turn 605 can change, route, or direct the flow of the fluid through the channel 345. The first turn 600 can direct the fluid away from the second plenum 325, into a center area of the channel region 340, and toward the first plenum 310. When there are multiple instances of the first turn 600, the first instance of the first turn 600 can direct fluid received from the initial end 350 of the channel 345 toward the center area. Subsequent instances of the first turn 600 can direct the fluid from the previous second turn 605 toward the first plenum 310. Conversely, the second turn 605 can direct the fluid away from the first plenum 310, into the channel region 340, and toward the second plenum 325. When there are multiple instances of the second turn 605, the last instance of the second turn 605 can direct fluid routed by the previous first turn 600 toward the terminal end 355 of the channel 345. Prior instance of the second turn 605 can direct the fluid from the previous first turn 600 toward the second plenum 325. While individual sub-volumes of fluid can be distributed to the respective channels 345, these sub-volumes can be considered as part of the same, overall fluid. These volumes conveyed through the channels 345 can be referred to the fluid.

In addition, the apparatus 215 can define or include at least one bypass 375. The bypass 375 can be defined in the channel region 340 of the surface 220 on the apparatus 215. The bypass 375 can correspond to a linear depression, trench, or trough defined spanning between at least one channel 345 and the terminal end 320 of the first plenum 310 along the distal edge 240 (e.g., as depicted). The bypass 375 can be substantially orthogonal (e.g., within 15% deviation) with the first plenum 310. The bypass 375 can also be substantially parallel (e.g., within 15% deviation) with at least one segment of one of the channels 345 or the distal edge 240 of the surface 220 on the apparatus 215. The bypass 375 can be substantially aligned (e.g., within 15% deviation as depicted) with at least one segment of the channels 345 along the distal edge 240. The bypass 375 can be offset from the segments of the channel 345. The linear depression corresponding to the bypass 375 can be of any shape, such as a prismatic hollowing into the surface 220 with a triangular, rectangular (e.g., as depicted), pentagonal, elliptical, and circular base, among others. Each bypass 375 can have a length ranging between 5-20 mm. The bypass 375 can have a width ranging between 2-5 mm. The width of the channel 345 can differ from the widths of the plenums (e.g., the first plenum 310 and the second plenum 325). For example, the bypass 375 can have a width be less than or equal to the width of at least one of the plenums. Conversely, the bypass 375 can have a width be greater than or the width of at least one of the plenums. The widths of the bypass 375 can also differ from the width of the channel 345. The bypass 375 can have a depth ranging between 1-8 mm.

The bypass 375 can fluidly couple the at least one of the channels 345 with the terminal end 320 of the first plenum 310. Fluidly coupled with the first plenum 310 and at least one of the channels 345, the bypass 375 can carry, pass, or otherwise convey the fluid from the first plenum 310 to at least one of the segments in the channel 345. The bypass 375 can have at least one initial edge proximate to, abutting, or connected with the first plenum 310. The initial edge of the bypass 375 can be fluidly coupled with the first plenum 310 via the terminal end 320 to accept, draw, or receive the fluid therefrom. The bypass 375 can have a terminal edge proximate to, abutting, or connected with the corresponding segment of the channel 345. The terminal edge of the bypass 375 can be fluidly coupled with the channel 345. The bypass 375 can carry, pass, or otherwise convey the fluid from the first plenum 310 received via the initial end 350 to the segment of the channel 345. The volume of the fluid conveyed via the bypass 375 can differ from the volume of fluid conveyed the other channels 345 (e.g., not connected to the bypass 375). For example, the bypass 375 can transfer 10-90% of the fluid and the channels 345 to transfer the remaining percentage of the fluid. The sub-volume volume of the fluid conveyed via the bypass 375 can be considered as part of the same, overall fluid distributed throughout the structures of the apparatus 215, and can be referred to also as the fluid.

Figure 8:
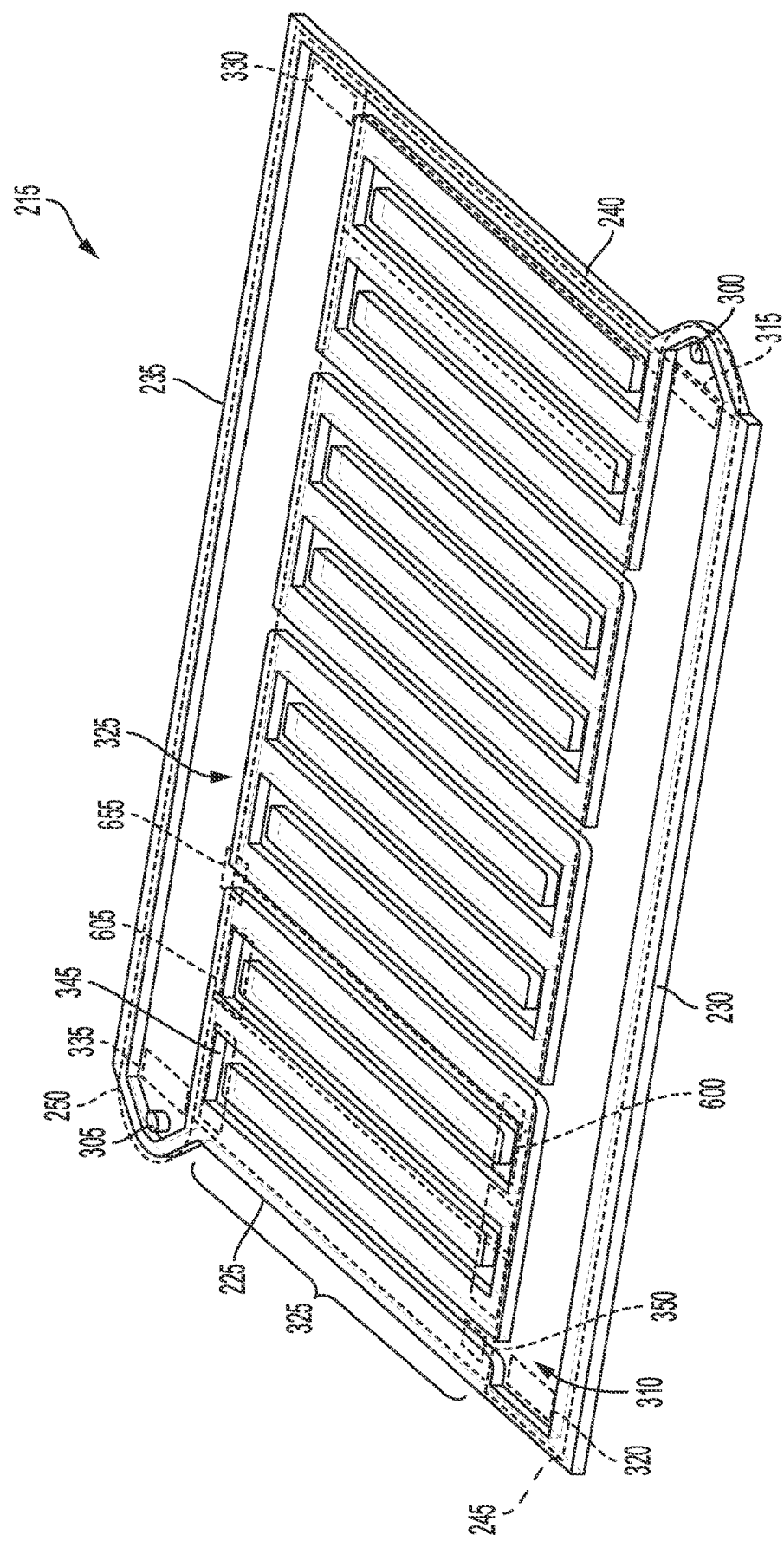
FIG. 8 depicts an isometric view of an example of an apparatus to regulate heat transfer.

FIG. 8, among others, depicts an isometric view of the apparatus 215 (e.g., a cold plate) to regulate heat transfer. The apparatus 215 depicted in FIG. 6 may be similar in structure to the apparatus 215 depicted in FIG. 6, but with structural components in different arrangements. The apparatus 215 can define or have at least one inlet 300 (e.g., an inlet port). The inlet 300 can be defined or included on the surface 220 of the apparatus 215. The inlet 300 can be fluidly coupled with the manifold 210 (e.g., another instance along the distal edge 240). Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at a corner along the distal edge 240 (e.g., as depicted) of the surface 220 of the apparatus 215. The corner can be opposite of the first corner 245 that is along the manifold edge 225.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned at the second corner 250 along the manifold edge 225 (e.g., as depicted) of the surface 220 of the apparatus 215.

The apparatus 215 can define or have at least one first plenum 310. The first plenum 310 can correspond to a linear depression, trench, or a trough defined on the surface 220 and spanning from the distal edge 240 to the manifold edge 210 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 along the distal edge 240. The initial end 315 can be situated, arranged, or positioned toward the corner on the distal edge 240 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have at least one second plenum 325. The second plenum 325 can correspond to a linear depression, trench, or a trough defined on the surface 220 and spanning from the manifold edge 225 to the distal edge 240 along the second lateral edge 235. The depression defining the second plenum 325 can be substantially parallel (e.g., within 15% deviation) to the second lateral edge 235 of the surface 220 of the apparatus 215. The depression corresponding to the second plenum 325 can be of any shape, such as a prismatic hollowing into the surface 220 with a triangular, rectangular (e.g., as depicted), pentagonal, elliptical, and circular base, among others. The second plenum 325 can be of an opposite orientation relative to the first plenum 310.

The second plenum 325 can be fluidly coupled with the outlet 305 to evacuate, drain, or otherwise release the fluid from the one or more other structures on the surface 220 of the apparatus 215. The second plenum 325 can be indirectly coupled with the first plenum 310 via one or more other structures defined on the surface 220 of the apparatus 215. The second plenum 325 can have at least one initial end 330 and at least one terminal end 335. The initial end 330 can correspond to an open edge of the second plenum 325 can be situated, arranged, or positioned toward the distal edge 240 of the surface 220. The terminal end 335 can correspond to an open edge of the second plenum 325 opposite of the initial end 330 and fluidly coupled with the outlet 305 at the second corner 250. The terminal end 335 can be situated, arranged, or positioned toward the manifold edge 225 of the surface 220. The second plenum 325 can draw, accept, or otherwise receive the fluid along a side between the initial end 330 and the terminal end 335. The second plenum 325 can direct, route, or otherwise convey the fluid to the terminal end 335 along the second lateral edge 235 to the outlet 305 to release the fluid from the surface 220 of the apparatus 215.

The apparatus 215 can define or have at least one channel region 340. The channel region 340 can correspond to a portion of the surface 220 of the apparatus 215 between the first plenum 310 and the second plenum 325 along one axis. The channel region 340 can correspond to a portion of the surface 220 of the apparatus 215 between the manifold edge 225 and the distal edge 240 along another axis, (e.g., substantially orthogonal axis, within 15% deviation). The channel region 340 can be bounded by the first plenum 310, the second plenum 325, the manifold edge 225, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have a set of channels 345. The set of channels 345 can be defined in the channel region 340 of the surface 220 of the apparatus 215. Each channel 345 can correspond to a depression, trench, or trough defined spanning across a portion of the surface 220 in the channel region 340 from the first plenum 310 to the second plenum 325. The depression corresponding to the channel 345 can meander, traverse, or span in a path of any form, such as circuitous, meandering, serpentine (e.g., as depicted), winding, or zigzagging, among others or any combination thereof. The apparatus 215 can include any number of channels for the set of channels 345, and can be less than 6, between 6-30, and more than 30, among others. The depression corresponding to each channel 345 can be of any shape, such as a prismatic hollowing into the surface 220 with a triangular, rectangular (e.g., as depicted), pentagonal, elliptical, and circular base, among others.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 650 and at least one terminal end 655. The initial end 650 can correspond to an edge of the channel 345 proximate to, abutting, or connected with the first plenum 310. The initial end 650 can be fluidly coupled with the first plenum 310 to accept, draw, or receive the fluid therefrom. The terminal end 655 can correspond to an edge of the channel 345 opposite to the initial end 650. The terminal end 655 can be proximate to, abutting, or connected with the second plenum 325. The terminal end 655 can be fluidly coupled with the second plenum 325. Each channel 345 can accept, draw, or otherwise receive the fluid from the first plenum 310 via the initial end 650. Each channel 345 can carry, pass, or otherwise convey the fluid from the first plenum 310 received via the initial end 650 to the second plenum 325. Each channel 345 can evacuate, drain, or otherwise release the fluid to the second plenum 325 via the terminal end 655.

Each channel 345 can also define or have at least one first turn 600 and at least one second turn 605 (e.g., a bend or curve). The first turn 600 and the second turn 605 can define the path of the respective channel 345 between the initial end 350 and the terminal end 355. Each of the turns 600 and 605 can define a set of segments for the channels 345. Each segment of the channel 345 can correspond to a generally linear depression between turns (e.g., the first turn 600 and the second turn 605), between the initial end 350 and a turn (e.g., the first turn 600), or between a turn (e.g., the second turn 605) and the terminal end 355. Each segment can be substantially parallel (e.g., within 15% deviation) with the manifold edge 225 or the distal edge 240, or substantially orthogonal (e.g., within 15% deviation) with the first plenum 310 or the second plenum 325. The channel 345 can include any number of first turns 600 and the second turns 605, and can be less than 6 (e.g., one as depicted), between 6 to 30, or more than 30, among others.

The first turn 600 and the second turn 605 can change, route, or direct the flow of the fluid through the channel 345. The first turn 600 can direct the fluid away from the second plenum 325, into a center area of the channel region 340, and toward the first plenum 310. When there are multiple instances of the first turn 600, the first instance of the first turn 600 can direct fluid received from the initial end 350 of the channel 345 toward the center area. Subsequent instances of the first turn 600 can direct the fluid from the previous second turn 605 toward the first plenum 310. Conversely, the second turn 605 can direct the fluid away from the first plenum 310, into the channel region 340, and toward the second plenum 325. When there are multiple instances of the second turn 605, the last instance of the second turn 605 can direct fluid routed by the previous first turn 600 toward the terminal end 355 of the channel 345. Prior instance of the second turn 605 can direct the fluid from the previous first turn 600 toward the second plenum 325. While individual sub-volumes of fluid can be distributed to the respective channels 345, these sub-volumes can be considered as part of the same, overall fluid. These volumes conveyed through the channels 345 can be referred to the fluid.

Figure 9:
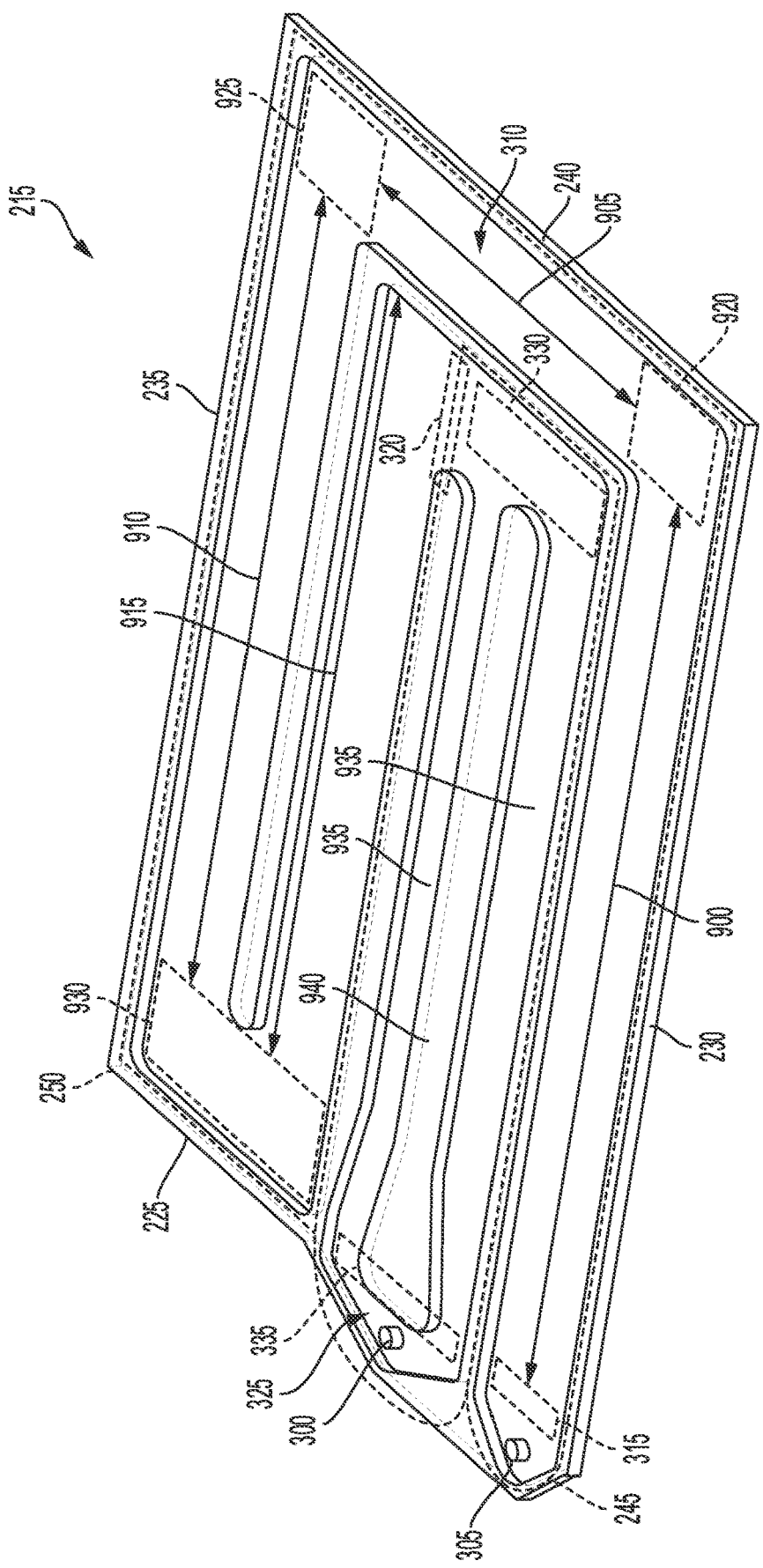
FIG. 9 depicts an isometric view of an example of an apparatus to regulate heat transfer.

FIG. 9, among others, depicts an isometric view of the apparatus 215 (e.g., a cold plate) to regulate heat transfer. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215. The inlet 300 can be positioned at an offset distance from the first corner 245. The offset distance can range between 5-300 mm The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned adjacent to the inlet 300 along the manifold edge 225 (e.g., as depicted).

The apparatus 215 can define or have at least one first plenum 310. The first plenum 310 can correspond to a depression, trench, or trough defined on the surface 220. The first plenum 310 can span between the manifold edge 225 and the distal edge 240. The depression corresponding to the first plenum 310 can meander, traverse, or span along the first lateral edge 230, the distal edge 240, the second lateral edge 235, and the manifold edge 225 (e.g., as depicted). The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300. The initial end 315 can be situated, arranged, or positioned by the first corner 245 along the manifold edge 225. The terminal end 320 can correspond to an open edge of the first plenum 310 opposite of the initial end 315. The first plenum 310 can draw, accept, or otherwise receive the fluid from the inlet 300 along the initial end 315. The first plenum 310 can direct, route, or otherwise convey the fluid from the initial end 315 to the terminal end 320.

The first plenum 310 can be divided into or have a set of segments, such as at least one first segment 900, at least one second segment 905, at least one third segment 910, and at least one fourth segment 915. The first plenum 310 can also have one or more turns (e.g., bends or curves) to define the segments, such as at least one first turn 920, at least one second turn 925, and at least one third turn 930. The segments can define the path of the flow of the fluid passed via the first plenum 310 between the initial end 315 and the terminal end 320 along the surface 220 of the apparatus 215. Each segment can correspond to a generally linear depression that is substantially parallel (e.g., within 15% deviation) or substantially orthogonal (e.g., within 15% deviation) with the manifold edge 225, the first lateral edge 230, the second lateral edge 235, or the distal edge 240. Each turn can correspond to a portion of the first plenum 310 at which the path changes direction, and can define the adjacent segments.

The first segment 900 can correspond to a portion of the first plenum 310 along the first lateral edge 230 spanning between the manifold edge 225 and the distal edge 240. The first segment 900 can be defined by the initial end 315 on one edge and the first turn 920 on the opposite edge. The first plenum 310 can carry, pass, or otherwise convey the fluid from the initial end 315 along the first segment 900 to the first turn 920. The first segment 900 can have a length similar (e.g., within 15%) to the length of the overall apparatus 215 (e.g., minus the allowance for external walls). The second segment 905 can be connected with the first segment 900, and can correspond to a portion to a portion of the first plenum 310 along the distal edge 240 spanning between the first lateral edge 230 and the second lateral edge 235. The second segment 905 can be defined by the first turn 920 on one edge and the second turn 925 on the other edge. The first plenum 310 can change, route, or direct the flow of the fluid from the first segment 900 via the first turn 920 to the second segment 905. The first plenum 310 can carry, pass, or otherwise convey the fluid along the second segment 905. The second segment 905 can have a length to span along the distal edge 240 of the apparatus 215.

Continuing on, the third segment 910 can be connected with the second segment 905, and can correspond to a portion of the first plenum 310 along the second lateral edge 235 spanning between the distal edge 240 and the manifold edge 225. The third segment 910 can be defined by the second turn 925 on one edge and the third turn 930 at the opposite edge. The first plenum 310 can change, route, or direct the flow of the fluid from the second segment 905 via the second turn 925 into the third segment 910. The first plenum 310 can carry, pass, or convey the fluid along the third segment 910. The third segment 910 can have a length similar (e.g., within 15%) to the length of the overall apparatus 215 (e.g., minus the allowance for external walls). The fourth segment 915 can be connected with the third segment 910, and can correspond to a portion of the first plenum 310 from the manifold edge 225 to an interior region of the surface 220 of the apparatus 215. The fourth segment 915 can be defined by the third turn 930 on one edge and the terminal end 320 on the other end. The first plenum 310 can change, route, or direct the flow of the fluid from the third segment 910 via the third turn 930 into the fourth segment 915. The first plenum 310 can carry, pass, or convey the fluid along the fourth segment 915 via the interior area of the surface 220 to the terminal end 320. The fourth segment 915 can have a length ranging between 40-100 mm.

The apparatus 215 can define or have at least one second plenum 325. The second plenum 325 can correspond to a linear depression, trench, or trough defined on the surface 220 and extending from the manifold edge 225 into the interior region of the surface 220. The depression defining the second plenum 325 can be substantially parallel (e.g., within 15% deviation) to the first lateral edge 230 or the second lateral edge 235 of the surface 220 of the apparatus 215. The depression defining the second plenum 325 can be substantially orthogonal (e.g., within 15% deviation) to the manifold edge 225 from which the second plenum 325 extends. With respect to the first plenum 310, the second plenum 325 can be substantially parallel with an adjacent segment (e.g., the fourth segment 915) of the first plenum 310. The depression corresponding to the second plenum 325 can be of any shape, such as a prismatic hollowing into the surface 220 with a triangular, rectangular (e.g., as depicted), pentagonal, elliptical, and circular base, among others.

The second plenum 325 can be fluidly coupled with the outlet 305 to evacuate, drain, or otherwise release the fluid from the one or more other structures on the surface 220 of the apparatus 215. The second plenum 325 can be fluidly coupled with the first plenum 310 (e.g., along the terminal end 320) to accept, draw, or otherwise receive the fluid from therefrom. The second plenum 325 can have at least one initial end 330 and at least one terminal end 335. The initial end 330 can correspond to an open edge of the second plenum 325 proximate to, abutting, or adjacent to the terminal end 320 of the first plenum 310. The initial end 330 can be arranged, situated, or otherwise positioned in the interior region of the surface 220. The terminal end 335 can correspond to an edge of the second plenum 325 opposite of the initial end 330, and can be fluidly coupled with the outlet 305 on the first corner 245 at the offset distance. The terminal end 335 can be situated, arranged, or positioned toward the manifold edge 225 of the surface 220 at the offset distance from the first corner 245. The second plenum 325 can draw, accept, or otherwise receive the fluid from the first plenum 310 via the initial end 330. The second plenum 325 can direct, route, or otherwise convey the fluid to the terminal end 335 from the first plenum 310 to the outlet 305 to release the fluid from the surface 220 of the apparatus 215.

The apparatus 215 can define or have a set of inlet channels 935. The apparatus 215 can define or have at least one outlet island 940 between a pair of adjacent inlet channels 935 within the second plenum 325. The set of inlet channels 935 can be defined within at least a portion of the second plenum 325. The outlet island 940 can correspond to a barrier, divider, or wall within the second plenum 325 to divide at least a portion of the second plenum 325 into the set of inlet channels 935. Each inlet channel 935 can correspond to a linear depression, trench, or trough defined spanning across the surface 220 within the second plenum 325 extending from an interior region to the manifold edge 225. The set of inlet channels 935 can be parallel or substantially parallel (e.g., within 15% deviation) with one another. The apparatus 215 can include any number of channels for the set of inlet channels 935, and can be less than 5 (e.g., 2 as depicted), between 6-30, and more than 30, among others. The linear depression corresponding to each inlet channel 935 can be of any shape, such as a prismatic hollowing into the surface 220 with a triangular, rectangular (e.g., as depicted), pentagonal, elliptical, and circular base, among others. Each inlet channel 935 can have a length ranging between 20-200 mm. Each inlet channel 935 can have a width ranging between 10-40 mm. The widths of the inlet channels 935 can also differ from one another. For example, a first inlet channel 935 (e.g., depicted on top) can have a width greater than a width of the inlet channel 935 (e.g., depicted on bottom). Each inlet channel 935 can have a depth ranging between 1-8 mm.

The set of inlet channels 935 can fluidly couple a remaining portion of the second plenum 325 toward the initial end 330 with the outlet 305 toward the terminal end 335. Each inlet channel 935 can have one edge toward the initial end 330 of the second plenum 325. The offset between the edge and the initial end 330 can differ among the set of inlet channels 935. At the edge toward the initial end 330, the inlet channel 935 can accept, take in, or otherwise receive the fluid from the first plenum 310 via the terminal end 320. In addition, each inlet channel 935 can have an opposite edge toward the terminal end 335 of the second plenum 325. Each inlet channel 935 at an offset from the outlet 305 or the terminal end 335 of the second plenum 325. The offset distances relative to the outlet 305 or the terminal end 335 can vary among the set of inlet channels 935. The set of inlet channels 935 can end or terminate before the terminal end 335 at the offset distance. The offset distance between the edge and the terminal end 335 can differ among the set of inlet channels 935. The set of inlet channels 935 can converge at an end of the outlet island 940 toward the terminal end 335 of the second plenum 325. While individual sub-volumes of fluid can be distributed throughout the inlet channels 935 and other structures on the surface 220 of the apparatus 215, these sub-volumes can be considered as part of the same, overall fluid. These volumes conveyed throughout the surface 220 can be referred to the fluid.

Figure 10:
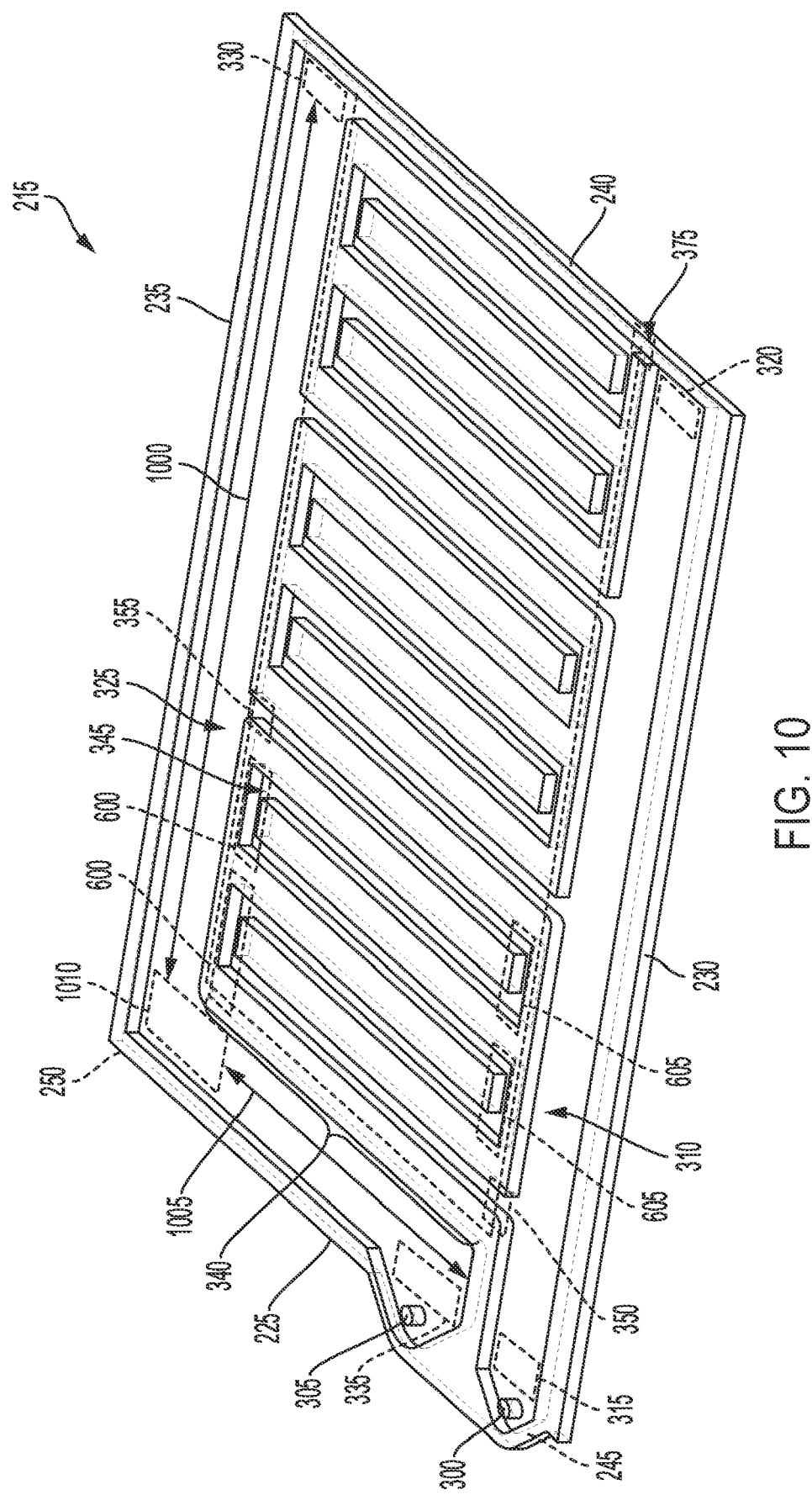
FIG. 10 depicts an isometric view of an example of an apparatus to regulate heat transfer.

FIG. 10, among others, depicts an isometric view of the apparatus 215 (e.g., a cold plate) to regulate heat transfer. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned adjacent to the inlet 300 along the manifold edge 225 (e.g., as depicted). The outlet 305 can be positioned at an offset distance from the first corner 245 or from the inlet 300. The offset distance can range between 100-200 mm.

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have at least one second plenum 325. The second plenum 325 can correspond to a linear depression, trench, or a trough defined on the surface 220. At least a portion of the second plenum 325 can span from the manifold edge 225 to the distal edge 240 along the second lateral edge 235 and at least another portion of the second plenum 325 can span along the manifold edge 225 extending from the second lateral edge 235 to the outlet 305 on the second corner 250 at the offset distance. The depression defining the second plenum 325 can be substantially parallel (e.g., within 15% deviation) to the second lateral edge 235 of the surface 220 of the apparatus 215. The second plenum 325 can be fluidly coupled with the outlet 305 to evacuate, drain, or otherwise release the fluid from the one or more other structures on the surface 220 of the apparatus 215. The second plenum 325 can be indirectly coupled with the first plenum 310 via one or more other structures defined on the surface 220 of the apparatus 215. The second plenum 325 can have at least one initial end 330 and at least one terminal end 335. The initial end 330 can correspond to an open edge of the second plenum 325 can be situated, arranged, or positioned toward the distal edge 240 of the surface 220. The terminal end 335 can correspond to an open edge of the second plenum 325 opposite of the initial end 330 and fluidly coupled with the outlet 305 on the first corner 245 at an offset distance. The terminal end 335 can be situated, arranged, or positioned toward the manifold edge 225 of the surface 220. The second plenum 325 can draw, accept, or otherwise receive the fluid along a side between the initial end 330 and the terminal end 335. The second plenum 325 can direct, route, or otherwise convey the fluid to the terminal end 335 along the second lateral edge 235 and at least a portion of the manifold edge 225 to the outlet 305 to release the fluid from the surface 220 of the apparatus 215.

The second plenum 325 can be divided into or have a set of segments, such as at least one first segment 1000 and at least one second segment 1005. The second plenum 325 can define or have at least one turn 1010 (e.g., a bend or a curve) to define the set of segments. The segments can define the path of the flow of the fluid in the second plenum 325 via the turn 1010 along the surface 220 of the apparatus 215. The turn 1010 can correspond to a change in direction of the path of the flow in the second plenum 325, and can be situated or positioned at the second corner 250. The first segment 1000 of the second plenum 325 can span from the distal edge 240 to the manifold edge 225 along the second lateral edge 235. The first segment 1000 can have one end along the distal edge 240 and an opposite end on the turn 1010 at the second corner 250. The first segment 1000 can be substantially parallel (e.g., within 15% deviation) with the second lateral edge 235. The first segment 1000 can carry, pass, or otherwise convey the fluid along the second lateral edge 235 toward the turn 1010. The second segment 1005 of the second plenum 325 can span along the manifold edge 225 from the turn 1010 to the outlet 305. The second segment 1005 can have one end along the second lateral edge 235 on the second corner 250 and an opposite end at the outlet 305 on the first corner 245 at an offset distance. The second segment 1016 can carry, pass, or otherwise convey the fluid along the manifold edge 225 from the turn 1010 to the outlet 305 to evacuate, drain, or otherwise release the fluid via the outlet 305.

The apparatus 215 can define or have at least one channel region 340. The channel region 340 can correspond to a portion of the surface 220 of the apparatus 215 between the first plenum 310 and the first segment 1000 of the second plenum 325 along one axis. The channel region 340 can correspond to a portion of the surface 220 of the apparatus 215 between the second segment 1005 of the second plenum 325 and the distal edge 240 along another axis, (e.g., substantially orthogonal axis, within 15% deviation). The channel region 340 can be bounded by the first plenum 310, the first segment 1000, the second segment 1005, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have a set of channels 345. The set of channels 345 can be defined in the channel region 340 of the surface 220 of the apparatus 215. Each channel 345 can correspond to a depression, trench, or trough defined spanning across a portion of the surface 220 in the channel region 340 from the first plenum 310 to the second plenum 325. The depression corresponding to the channel 345 can meander, traverse, or span in a path of any form, such as circuitous, meandering, serpentine (e.g., as depicted), winding, or zigzagging, among others or any combination thereof. The apparatus 215 can include any number of channels for the set of channels 345, and can be less than 5 (e.g., one as depicted), between 6 to 30, or more than 30, among others.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 350 and at least one terminal end 355. The initial end 350 can correspond to an edge of the channel 345 proximate to, abutting, or connected with the first plenum 310. The initial end 350 can be fluidly coupled with the first plenum 310 to accept, draw, or receive the fluid therefrom. The terminal end 355 can correspond to an edge of the channel 345 opposite to the initial end 350. The terminal end 355 can be proximate to, abutting, or connected with the second plenum 325. The terminal end 355 can be fluidly coupled with the second plenum 325. Each channel 345 can accept, draw, or otherwise receive the fluid from the first plenum 310 via the initial end 350. Each channel 345 can carry, pass, or otherwise convey the fluid from the first plenum 310 received via the initial end 350 to the second plenum 325. Each channel 345 can evacuate, drain, or otherwise release the fluid to the second plenum 325 via the terminal end 355.

Each channel 345 can also define or have at least one first turn 600 and at least one second turn 605 (e.g., a bend or curve). The first turn 600 and the second turn 605 can define the path of the respective channel 345 between the initial end 350 and the terminal end 355. Each of the turns 600 and 605 can define a set of segments for the channels 345. Each segment of the channel 345 can correspond to a generally linear depression between turns (e.g., the first turn 600 and the second turn 605), between the initial end 350 and a turn (e.g., the first turn 600), or between a turn (e.g., the second turn 605) and the terminal end 355. Each segment can be substantially parallel (e.g., within 15% deviation) with the manifold edge 225 or the distal edge 240, or substantially orthogonal (e.g., within 15% deviation) with the first plenum 310 or the second plenum 325. The channel 345 can include any number of first turns 600 and the second turns 605, ranging between and can be less than 6 (e.g., two each as depicted), between 6 to 30, or more than 30, among others.

The first turn 600 and the second turn 605 can change, route, or direct the flow of the fluid through the channel 345. The first turn 600 can direct the fluid away from the second plenum 325, into a center area of the channel region 340, and toward the first plenum 310. When there are multiple instances of the first turn 600, the first instance of the first turn 600 can direct fluid received from the initial end 350 of the channel 345 toward the center area. Subsequent instances of the first turn 600 can direct the fluid from the previous second turn 605 toward the first plenum 310. Conversely, the second turn 605 can direct the fluid away from the first plenum 310, into the channel region 340, and toward the second plenum 325. When there are multiple instances of the second turn 605, the last instance of the second turn 605 can direct fluid routed by the previous first turn 600 toward the terminal end 355 of the channel 345. Prior instance of the second turn 605 can direct the fluid from the previous first turn 600 toward the second plenum 325. While individual sub-volumes of fluid can be distributed to the respective channels 345, these sub-volumes can be considered as part of the same, overall fluid. These volumes conveyed through the channels 345 can be referred to the fluid.

The apparatus 215 can define or include at least one bypass 375. The bypass 375 can be defined in the channel region 340 of the surface 220 on the apparatus 215. The bypass 375 can correspond to a linear depression, trench, or trough defined spanning between at least one channel 345 and the terminal end 320 of the first plenum 310 along the distal edge 240 (e.g., as depicted). The bypass 375 can be substantially orthogonal (e.g., within 15% deviation) with the first plenum 310. The bypass 375 can also be substantially parallel (e.g., within 15% deviation) with at least one segment of one of the channels 345 or the distal edge 240 of the surface 220 on the apparatus 215. The bypass 375 can be substantially aligned (e.g., within 15% deviation as depicted) with at least one segment of the channels 345 along the distal edge 240. The bypass 375 can be offset from the segments of the channel 345. The linear depression corresponding to the bypass 375 can be of any shape, such as a prismatic hollowing into the surface 220 with a triangular, rectangular (e.g., as depicted), pentagonal, elliptical, and circular base, among others. Each bypass 375 can have a length ranging between 5-20 mm. The bypass 375 can have a width ranging between 2-5 mm. The width of the channel 345 can differ from the widths of the plenums (e.g., the first plenum 310 and the second plenum 325). For example, the bypass 375 can have a width be less than or equal to the width of at least one of the plenums. Conversely, the bypass 375 can have a width be greater than or the width of at least one of the plenums. The widths of the bypass 375 can also differ from the width of the channel 345. The bypass 375 can have a depth ranging between 1-8 mm.

The bypass 375 can fluidly couple the at least one of the channels 345 with the terminal end 320 of the first plenum 310. Fluidly coupled with the first plenum 310 and at least one of the channels 345, the bypass 375 can carry, pass, or otherwise convey the fluid from the first plenum 310 to at least one of the segments in the channel 345. The bypass 375 can have at least one initial edge proximate to, abutting, or connected with the first plenum 310. The initial edge of the bypass 375 can be fluidly coupled with the first plenum 310 via the terminal end 320 to accept, draw, or receive the fluid therefrom. The bypass 375 can have a terminal edge proximate to, abutting, or connected with the corresponding segment of the channel 345. The terminal edge of the bypass 375 can be fluidly coupled with the channel 345. The bypass 375 can carry, pass, or otherwise convey the fluid from the first plenum 310 received via the initial end 350 to the segment of the channel 345. The volume of the fluid conveyed via the bypass 375 can differ from the volume of fluid conveyed the other channels 345 (e.g., not connected to the bypass 375). For example, the bypass 375 can transfer 10-90% of the fluid and the channels 345 to transfer the remaining percentage of the fluid. The sub-volume volume of the fluid conveyed via the bypass 375 can be considered as part of the same, overall fluid distributed throughout the structures of the apparatus 215, and can be referred to also as the fluid.

Figure 11:
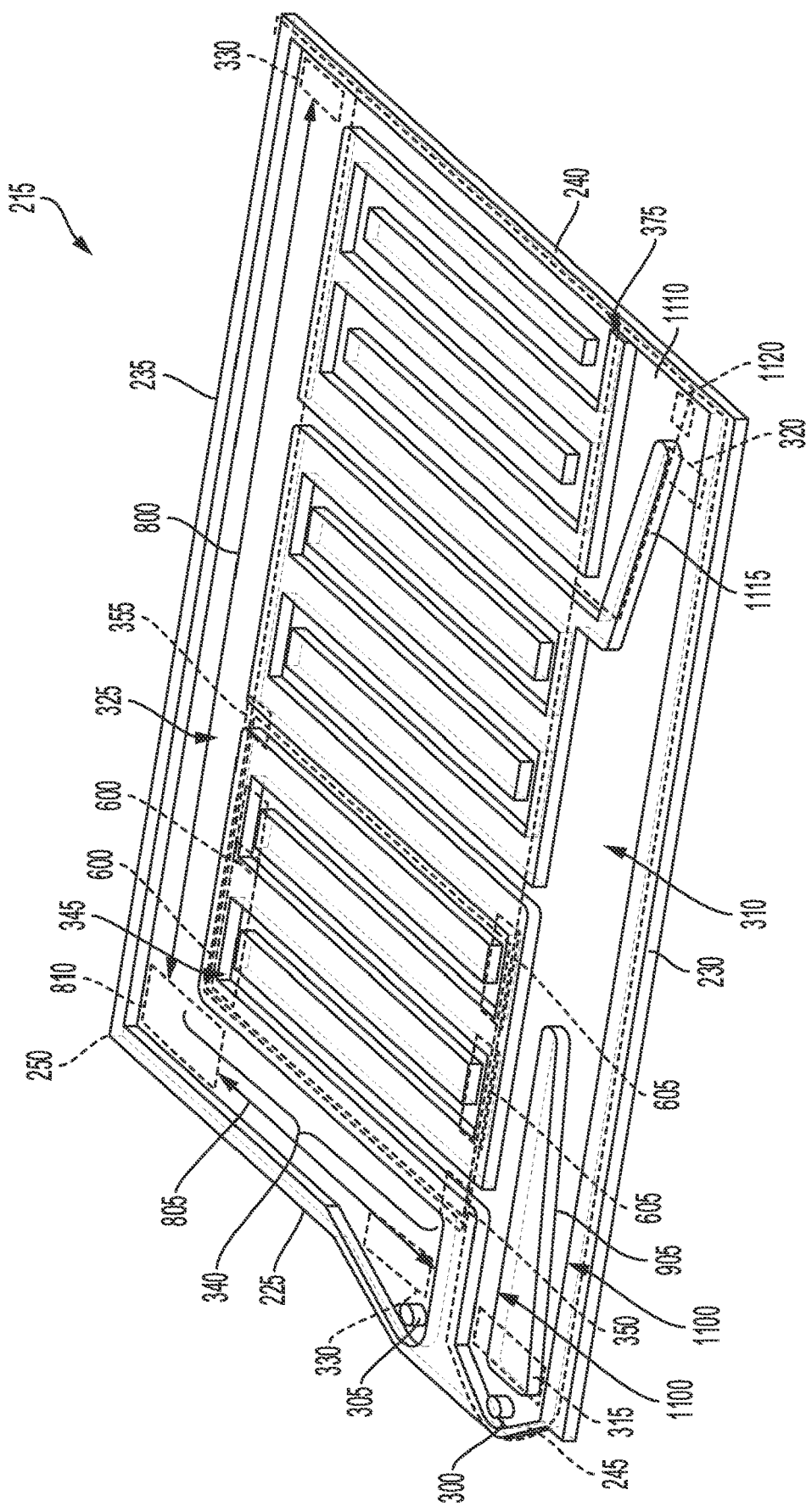
FIG. 11 depicts an isometric view of an example of an apparatus to regulate heat transfer.

FIG. 11, among others, depicts an isometric view of the apparatus 215 (e.g., a cold plate) to regulate heat transfer. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned adjacent to the inlet 300 along the manifold edge 225 (e.g., as depicted). The outlet 305 can be positioned at an offset distance from the first corner 245 or from the inlet 300. The offset distance can range between 5-300 mm.

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have a set of inlet channels 1100. The apparatus 215 can define or have at least one inlet island 1105 between a pair of adjacent inlet channels 1100 within the first plenum 310. The set of inlet channels 1100 can be defined within at least a portion of the first plenum 310. The inlet island 1105 can correspond to a barrier, divider, or wall within the first plenum 310 to divide at least a portion of the first plenum 310 into the set of inlet channels 1100. Each inlet channel 1100 can correspond to a linear depression, trench, or trough defined spanning across the surface 220 within the first plenum 310 from the manifold edge 225 to the medial portion of the first plenum 310. The set of inlet channels 1100 can be parallel or substantially parallel (e.g., within 15% deviation) with one another. The apparatus 215 can include any number of channels for the set of inlet channels 1100, and can be less than 5 (e.g., two as depicted), between 6-30, and more than 30, among others. The linear depression corresponding to each inlet channel 1100 can be of any shape, such as a prismatic hollowing into the surface 220 with a triangular, rectangular (e.g., as depicted), pentagonal, elliptical, and circular base, among others. Each inlet channel 1100 can have a length ranging between 10-150 mm. Each inlet channel 1100 can have a width ranging between 5-20 mm. The widths of the inlet channels 1100 can also differ from one another. For example, a first inlet channel 1100 (e.g., depicted on top) can have a width greater than a width of the inlet channel 1100 (e.g., depicted on bottom). Each inlet channel 1100 can have a depth ranging between 1-8 mm.

The set of inlet channels 1100 can fluidly couple one portion of the first plenum 310 toward the initial end 315 with a medial portion of the first plenum 310 at the terminal end 320. Each inlet channel 1100 can have one edge toward the initial end 315 of the first plenum 310. The offset between the edge and the initial end 315 can differ among the set of inlet channels 1100. At the edge toward the initial end 315, the inlet channel 1100 can accept, take in, or otherwise receive the fluid from the inlet 300. In addition, each inlet channel 1100 can have an opposite edge in the medial portion of the first plenum 310 toward the terminal end 320. Each inlet channel 1100 at an offset from the inlet 300 or the initial end 315 of the first plenum 310. The offset distances relative to the outlet 305 or the initial end 315 can vary among the set of inlet channels 1100. The set of inlet channels 1100 can end or terminate before the terminal end 320 at the offset distance. The offset distance between the edge and the terminal end 320 can differ among the set of inlet channels 1100. The set of inlet channels 1100 can converge at an end of the inlet island 1105 toward the medial portion of the first plenum 310. While individual sub-volumes of fluid can be distributed throughout the inlet channels 1100 and other structures on the surface 220 of the apparatus 215, these sub-volumes can be considered as part of the same, overall fluid. These volumes conveyed throughout the surface 220 can be referred to the fluid.

The apparatus 215 can define or have at least one basin 1110. The apparatus 215 can define or have at least one basin wall 1115 within the first plenum 310 to partition, divide, or otherwise separate the basin 1110 from the remainder of the first plenum 310. The basin 1110 can be defined within at least a portion of the first plenum 310. The basin 1110 can be arranged, situated, or otherwise positioned toward the terminal end 320 in the first plenum 310. The basin 1110 can correspond to a depression, trench, or trough defined spanning across the surface 220 within the first plenum 310, for example, along the first lateral edge 230 and the distal edge 240 as defined by the basin wall 1115. The basin wall 1115 can be at least partially extend from one side of the first plenum 310 (e.g., opposite of the first lateral edge 230 as depicted). For example, the basin wall 1115 can extend between 25%-75% into the interior of the first plenum 310 from the side. At least a portion of the basin wall 1115 can be at a slant or oblique relative to the first lateral edge 230. The depression corresponding to the basin 1110 can be of any shape, such as a triangular, rectangular (e.g., as depicted), pentagonal, elliptical, and circular hollowing into the surface 220. The basin 1110 can have a width ranging between 25-75% of the width of the first plenum 310. The basin 1110 can have a depth ranging between 1-8 mm.

The basin 1110 can be fluidly coupled with the first plenum 310, such as at the terminal end 320 as depicted. The basin 1110 can have at least one mouth 1120. The mouth 1120 can be defined along the basin wall 1115 and can correspond to an open side of the basin 1110 proximate to, abutting, or connected with the first plenum 310. The basin 1110 can accept, take in, or otherwise receive the fluid conveyed through the first plenum 310 along the first lateral edge 230 via the mouth 1120. The basin 1110 can be fluidly coupled with one or more other structures on the surface 220 of the apparatus 215. The basin 1110 can carry, pass, or otherwise convey the fluid received via the mouth 1120 to the other structures. The basin wall 1115 can partially obstruct or block the flow of the fluid from the initial end 315 in the first plenum 310. The basin 1110 and the basin wall 1115 can regulate the rate of flow of the fluid as the fluid is conveyed to the other structures.

The apparatus 215 can define or have at least one second plenum 325. The second plenum 325 can correspond to a linear depression, trench, or a trough defined on the surface 220. At least a portion of the second plenum 325 can span from the manifold edge 225 to the distal edge 240 along the second lateral edge 235 and at least another portion of the second plenum 325 can span along the manifold edge 225 extending from the second lateral edge 235 to the outlet 305 on the second corner 250 at the offset distance. The depression defining the second plenum 325 can be substantially parallel (e.g., within 15% deviation) to the second lateral edge 235 of the surface 220 of the apparatus 215. The depression corresponding to the second plenum 325 can be of any shape, such as a prismatic hollowing into the surface 220 with a triangular, rectangular (e.g., as depicted), pentagonal, elliptical, and circular base, among others.

The second plenum 325 can be fluidly coupled with the outlet 305 to evacuate, drain, or otherwise release the fluid from the one or more other structures on the surface 220 of the apparatus 215. The second plenum 325 can be indirectly coupled with the first plenum 310 via one or more other structures defined on the surface 220 of the apparatus 215. The second plenum 325 can have at least one initial end 330 and at least one terminal end 335. The initial end 330 can correspond to an open edge of the second plenum 325 can be situated, arranged, or positioned toward the distal edge 240 of the surface 220. The terminal end 335 can correspond to an open edge of the second plenum 325 opposite of the initial end 330 and fluidly coupled with the outlet 305 on the first corner 245 at an offset distance. The terminal end 335 can be situated, arranged, or positioned toward the manifold edge 225 of the surface 220. The second plenum 325 can draw, accept, or otherwise receive the fluid along a side between the initial end 330 and the terminal end 335. The second plenum 325 can direct, route, or otherwise convey the fluid to the terminal end 335 along the second lateral edge 235 and at least a portion of the manifold edge 225 to the outlet 305 to release the fluid from the surface 220 of the apparatus 215.

The second plenum 325 can be divided into or have a set of segments, such as at least one first segment 1000 and at least one second segment 1005. The second plenum 325 can define or have at least one turn 1010 (e.g., a bend or a curve) to define the set of segments. The segments can define the path of the flow of the fluid in the second plenum 325 via the turn 1010 along the surface 220 of the apparatus 215. The turn 1010 can correspond to a change in direction of the path of the flow in the second plenum 325, and can be situated or positioned at the second corner 250. The first segment 1000 of the second plenum 325 can span from the distal edge 240 to the manifold edge 225 along the second lateral edge 235. The first segment 1000 can have one end along the distal edge 240 and an opposite end on the turn 1010 at the second corner 250. The first segment 1000 can be substantially parallel (e.g., within 15% deviation) with the second lateral edge 235. The first segment 1000 can carry, pass, or otherwise convey the fluid along the second lateral edge 235 toward the turn 1010. The second segment 1005 of the second plenum 325 can span along the manifold edge 225 from the turn 1010 to the outlet 305. The second segment 1005 can have one end along the second lateral edge 235 on the second corner 250 and an opposite end at the outlet 305 on the first corner 245 at an offset distance. The second segment 1005 can carry, pass, or otherwise convey the fluid along the manifold edge 225 from the turn 1010 to the outlet 305 to evacuate, drain, or otherwise release the fluid via the outlet 305.

The apparatus 215 can define or have at least one channel region 340. The channel region 340 can correspond to a portion of the surface 220 of the apparatus 215 between the first plenum 310 and the first segment 1000 of the second plenum 325 along one axis. The channel region 340 can correspond to a portion of the surface 220 of the apparatus 215 between the second segment 1005 of the second plenum 325 and the distal edge 240 along another axis, (e.g., substantially orthogonal axis, within 15% deviation). The channel region 340 can be bounded by the first plenum 310, the first segment 1000, the second segment 1005, and the distal edge 240. The channel region 340 can be of any shape. For example, the shape of the channel region 340 can be a polygon, such as a triangle, a square, a rectangle (e.g., as depicted), a pentagon, or a hexagon, among others. The channel region 340 can be fluidly couple the first plenum 310 with the second plenum 325 to carry, pass, or otherwise convey the fluid from the first plenum 310 to the second plenum 325.

The apparatus 215 can define or have a set of channels 345. The set of channels 345 can be defined in the channel region 340 of the surface 220 of the apparatus 215. Each channel 345 can correspond to a depression, trench, or trough defined spanning across a portion of the surface 220 in the channel region 340 from the first plenum 310 to the second plenum 325. The depression corresponding to the channel 345 can meander, traverse, or span in a path of any form, such as circuitous, meandering, serpentine (e.g., as depicted), winding, or zigzagging, among others or any combination thereof. The apparatus 215 can include any number of channels for the set of channels 345, and can be less than 5, between 5 to 30, or more than 30, among others. The depression corresponding to each channel 345 can be of any shape, such as a prismatic hollowing into the surface 220 with a triangular, rectangular (e.g., as depicted), pentagonal, elliptical, and circular base, among others.

The set of channels 345 can fluidly couple the first plenum 310 with the second plenum 325. Fluidly coupled with the first plenum 310 and the second plenum 325, each channel 345 can carry, pass, or otherwise convey the fluid from the first plenum 310 to the second plenum 325. Each channel 345 can have at least one initial end 350 and at least one terminal end 355. The initial end 350 can correspond to an edge of the channel 345 proximate to, abutting, or connected with the first plenum 310. The initial end 350 can be fluidly coupled with the first plenum 310 to accept, draw, or receive the fluid therefrom. The terminal end 355 can correspond to an edge of the channel 345 opposite to the initial end 350. The terminal end 355 can be proximate to, abutting, or connected with the second plenum 325. The terminal end 355 can be fluidly coupled with the second plenum 325. Each channel 345 can accept, draw, or otherwise receive the fluid from the first plenum 310 via the initial end 350. Each channel 345 can carry, pass, or otherwise convey the fluid from the first plenum 310 received via the initial end 350 to the second plenum 325. Each channel 345 can evacuate, drain, or otherwise release the fluid to the second plenum 325 via the terminal end 355.

Each channel 345 can also define or have at least one first turn 600 and at least one second turn 605 (e.g., a bend or curve). The first turn 600 and the second turn 605 can define the path of the respective channel 345 between the initial end 350 and the terminal end 355. Each of the turns 600 and 605 can define a set of segments for the channels 345. Each segment of the channel 345 can correspond to a generally linear depression between turns (e.g., the first turn 600 and the second turn 605), between the initial end 350 and a turn (e.g., the first turn 600), or between a turn (e.g., the second turn 605) and the terminal end 355. Each segment can be substantially parallel (e.g., within 15% deviation) with the manifold edge 225 or the distal edge 240, or substantially orthogonal (e.g., within 15% deviation) with the first plenum 310 or the second plenum 325. The channel 345 can include any number of first turns 600 and the second turns 605, and can be less than 6 (e.g., 2 each as depicted), between 6-30, or more than 30, among others.

The first turn 600 and the second turn 605 can change, route, or direct the flow of the fluid through the channel 345. The first turn 600 can direct the fluid away from the second plenum 325, into a center area of the channel region 340, and toward the first plenum 310. When there are multiple instances of the first turn 600, the first instance of the first turn 600 can direct fluid received from the initial end 350 of the channel 345 toward the center area. Subsequent instances of the first turn 600 can direct the fluid from the previous second turn 605 toward the first plenum 310. Conversely, the second turn 605 can direct the fluid away from the first plenum 310, into the channel region 340, and toward the second plenum 325. When there are multiple instances of the second turn 605, the last instance of the second turn 605 can direct fluid routed by the previous first turn 600 toward the terminal end 355 of the channel 345. Prior instance of the second turn 605 can direct the fluid from the previous first turn 600 toward the second plenum 325. While individual sub-volumes of fluid can be distributed to the respective channels 345, these sub-volumes can be considered as part of the same, overall fluid. These volumes conveyed through the channels 345 can be referred to the fluid.

The apparatus 215 can define or include at least one bypass 375. The bypass 375 can be defined in the channel region 340 of the surface 220 on the apparatus 215. The bypass 375 can correspond to a linear depression, trench, or trough defined spanning between at least one channel 345 and the terminal end 320 of the first plenum 310 along the distal edge 240 (e.g., as depicted). The bypass 375 can be substantially orthogonal (e.g., within 15% deviation) with the first plenum 310. The bypass 375 can also be substantially parallel (e.g., within 15% deviation) with at least one segment of one of the channels 345. The bypass 375 can be substantially aligned (e.g., within 15% deviation as depicted) with at least one segment of the channels 345 along the distal edge 240. The bypass 375 can be offset from the segments of the channel 345. The linear depression corresponding to the bypass 375 can be of any shape, such as a prismatic hollowing into the surface 220 with a triangular, rectangular (e.g., as depicted), pentagonal, elliptical, and circular base, among others. The width of the bypass 375 can differ from the widths of the plenums (e.g., the first plenum 310 and the second plenum 325). For example, the bypass 375 can have a width be less than or equal to the width of at least one of the plenums. Conversely, the bypass 375 can have a width greater than or the width of at least one of the plenums. The widths of the bypass 375 can also differ from the width of the channel 345.

The bypass 375 can fluidly couple the terminal end 320 of the first plenum 310 or the basin 1110 with at least one of the channels 345. Fluidly coupled with the first plenum 310 or the basin 1110, the bypass 375 can carry, pass, or otherwise convey the fluid into at least one of the channels 345. The bypass 375 can have an initial edge proximate to, abutting, or connected with the first plenum 310 or the basin 1110 (e.g., as depicted). The initial edge of the bypass 375 can be fluidly coupled with the first plenum 310 to accept, draw, or receive the fluid via the basin 1110. The bypass 375 can have a terminal edge opposite to the initial edge. The terminal edge of the bypass 375 can be fluidly coupled with the channel 345. The bypass 375 can carry, pass, or otherwise convey the fluid from the first plenum 310 received via the initial end 350 to the segment of the channel 345. The volume of the fluid conveyed via the bypass 375 can differ from the volume of fluid conveyed the other channels 345 (e.g., not connected to the bypass 375). For example, the bypass 375 can transfer 10-90% of the fluid and the channels 345 to transfer the remaining percentage of the fluid. The sub-volume volume of the fluid conveyed via the bypass 375 can be considered as part of the same, overall fluid distributed throughout the structures of the apparatus 215, and can be referred to also as the fluid.

Figure 12:
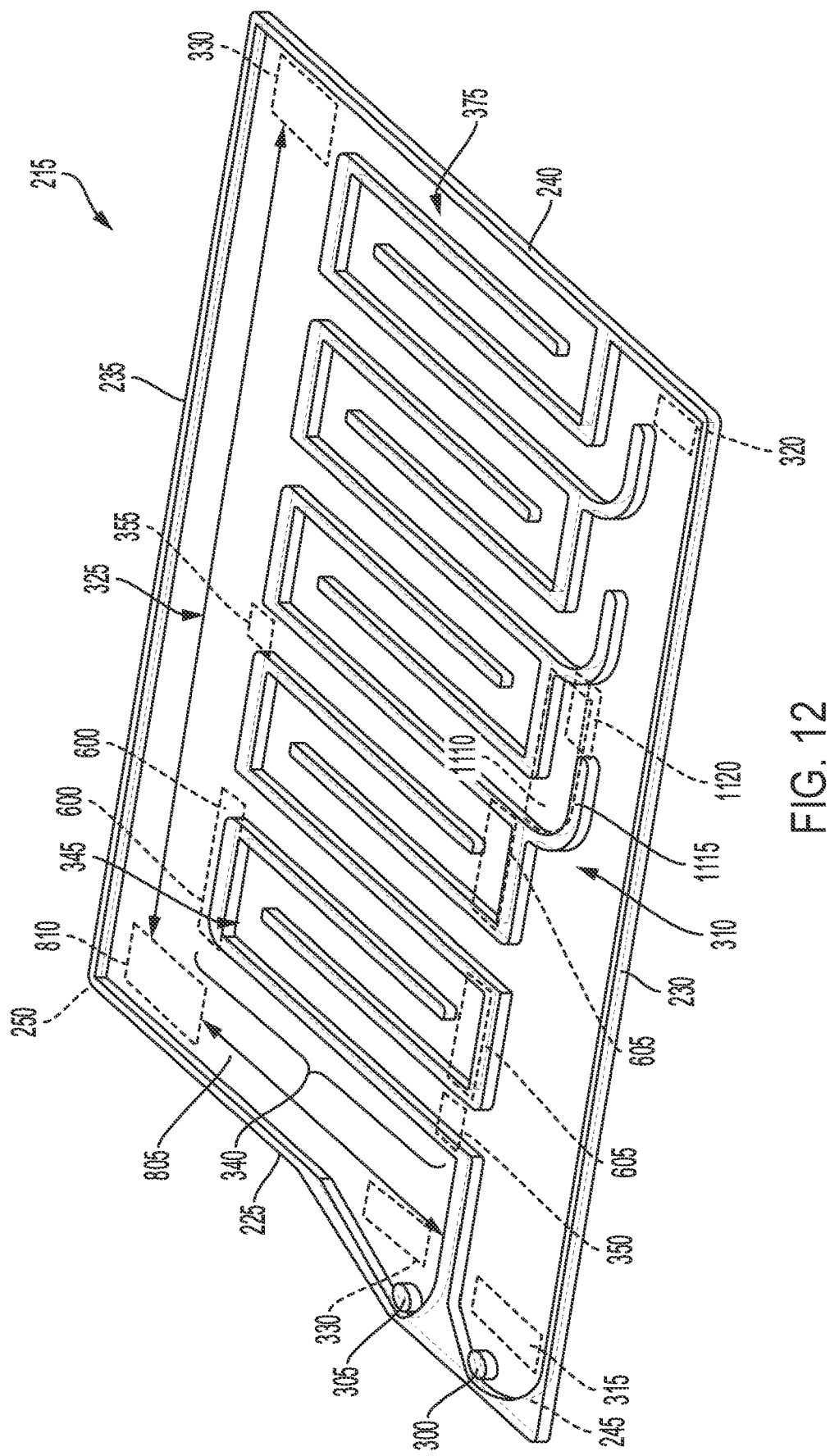
FIG. 12 depicts an isometric view of an example of an apparatus to regulate heat transfer.

FIG. 12 depicts, among others, depicts an isometric view of the apparatus 215 (e.g., a cold plate) to regulate heat transfer. The apparatus 215 depicted in FIG. 11 may be similar in structure to the apparatus 215 depicted in FIG. 12, but with additional structural components. The apparatus 215 can define or have at least one inlet 300 (e.g., an inlet port). The inlet 300 can be defined or included on the surface 220 of the apparatus 215. The inlet 300 can be fluidly coupled with the manifold 210. Fluidly coupled, the inlet 300 can draw, accept, or otherwise receive the fluid conveyed by the manifold 210. The inlet 300 can distribute, circulate, or otherwise convey the fluid from the manifold 210 to other structures on the surface 220 of the apparatus 215. The inlet 300 can correspond to an aperture or port situated, arranged, or positioned relative to the manifold 210. For example, the inlet 300 can be a port positioned over the manifold 210 to draw fluid conveyed by the manifold 210 onto the surface 220 of the apparatus 215. The inlet 300 can be arranged, situated, or otherwise positioned at the first corner 245 along the manifold edge 225 (e.g., as depicted) of the surface 220 of the apparatus 215.

The apparatus 215 can define or have at least one outlet 305 (e.g., an outlet port). The outlet 305 can be defined or included on the surface 220 of the apparatus 215. The outlet 305 can be fluidly coupled with the manifold 210. Fluidly coupled, the outlet 305 can evacuate, drain, or otherwise release the fluid received via the inlet 300 into the manifold 210. The outlet 305 can accept or receive the fluid conveyed from the inlet 300 via other structures on the surface 220 of the apparatus 215. The outlet 305 can correspond to an aperture or port situated, arranged, or positioned relative to the manifold 210. For example, the outlet 305 can be a port positioned over the manifold 210 to release the fluid back into the manifold 210 from the surface 220 of the apparatus 215. The outlet 305 can be arranged, situated, or otherwise positioned adjacent to the inlet 300 along the manifold edge 225 (e.g., as depicted). The outlet 305 can be positioned at an offset distance from the first corner 245 or from the inlet 300. The offset distance can range between 5-300 mm.

The apparatus 215 can define or have at least one first plenum 310. The first plenum 310 can correspond to a linear depression, trench, or a trough defined on the surface 220 and spanning from the manifold edge 225 to the distal edge 240 along the first lateral edge 230. The depression defining the first plenum 310 can be substantially parallel (e.g., within 15% deviation) to the first lateral edge 230 of the surface 220 of the apparatus 215. The depression corresponding to the first plenum 310 can be of any shape, such as a prismatic hollowing into the surface 220 with a triangular, rectangular (e.g., as depicted), pentagonal, elliptical, and circular base, among others.

The first plenum 310 can be fluidly coupled with the inlet 300 to draw, accept, or otherwise receive the fluid onto the surface 220 of the apparatus 215. The first plenum 310 can have at least one initial end 315 and at least one terminal end 320. The initial end 315 can correspond to an open edge of the first plenum 310 fluidly coupled with the inlet 300 at the first corner 245. The initial end 315 can be situated, arranged, or positioned toward the manifold edge 225 of the surface 220. The terminal end 320 can correspond to an open edge of the first plenum 310 opposite of the initial end 315. The terminal end 320 can be situated, arranged, or positioned toward the distal edge 240 of the surface 220. The first plenum 310 can draw, accept, or otherwise receive the fluid from the inlet 300 along the initial end 315. The first plenum 310 can direct, route, or otherwise convey the fluid from the initial end 315 to the terminal end 320 along the first lateral edge 230. The first plenum 310 can deliver, circulate, or otherwise distribute volumes of the fluid to other structures defined on the apparatus 215, while conveying the fluid from the initial end 315 to the terminal end 320. While individual sub-volumes of fluid can be distributed throughout the structures on the surface 220 of the apparatus 215, these sub-volumes can be considered as part of the same, overall fluid. These volumes conveyed throughout the surface 220 can be referred to the fluid.

The apparatus 215 can define or have at least one basin 1110. The apparatus 215 can define or have at least one basin wall 1115 within the first plenum 310 to partition, divide, or otherwise separate the basin 1110 from the remainder of the first plenum 310. The basin 1110 can be defined within at least a portion of the first plenum 310. The basin 1110 can be arranged, situated, or otherwise positioned within the first plenum 310 (e.g., as marked). The basin 1110 can correspond to a depression, trench, or trough defined spanning across the surface 220 within the first plenum 310, for example, along the first lateral edge 230 as defined by the basin wall 1115. The basin wall 1115 can be at least partially extend from one side of the first plenum 310 (e.g., opposite of the first lateral edge 230 as depicted). For example, the basin wall 1115 can extend between 25%-75% into the interior of the first plenum 310 from the side. At least a portion of the basin wall 1115 can be a curved (e.g., as depicted) relative to the first lateral edge 230. The depression corresponding to the basin 1110 can be of any shape, such as a triangular, rectangular (e.g., as depicted), pentagonal, elliptical, and circular hollowing into the surface 220. The basin 1110 can have a width ranging between 25-75% of the width of the first plenum 310. The basin 1110 can have a depth ranging between 1-8 mm.

The basin 1110 can be fluidly coupled with the first plenum 310, such as generally in the middle of the first plenum 310 or at the terminal end 320 as depicted. The basin 1110 can have at least one mouth 1120. The mouth 1120 can be defined along the basin wall 1115 and can correspond to an open side of the basin 1110 proximate to, abutting, or connected with the first plenum 310. The basin 1110 can accept, take in, or otherwise receive the fluid conveyed through the first plenum 310 along the first lateral edge 230 via the mouth 1120. The basin 1110 can be fluidly coupled with one or more other structures on the surface 220 of the apparatus 215. The basin 1110 can carry, pass, or otherwise convey the fluid received via the mouth 1120 to the other structures. The basin wall 1115 can partially obstruct or block the flow of the fluid from the initial end 315 in the first plenum 310. The basin 1110 and the basin wall 1115 can regulate the rate of flow of the fluid as the fluid is conveyed to the other structures.

Figure 13:
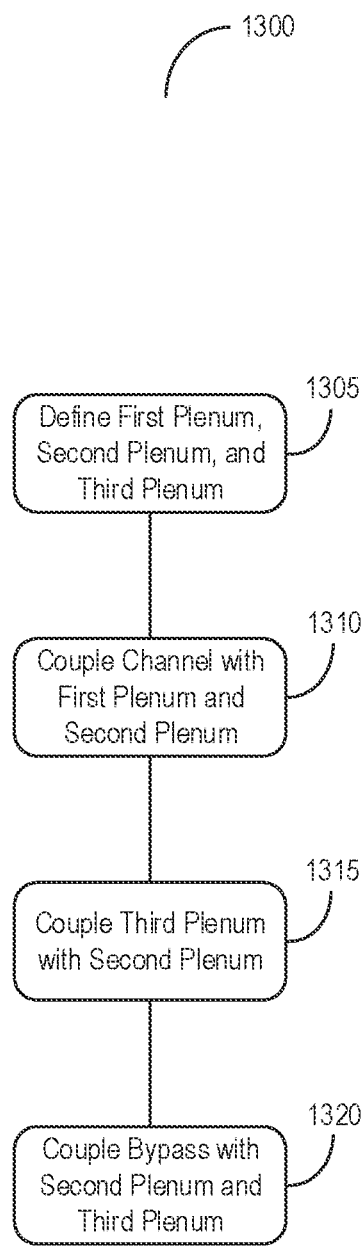
FIG. 13 depicts a flow diagram of an example of a method of assembling an apparatus to regulate heat transfer.

FIG. 13 depicts a flow diagram of a method 1300 of the apparatus 215 to regulate heat transfer. The method 1300 can include defining a first plenum 310, a second plenum 325, and a third plenum 360 (ACT 1305). The first plenum 310, the second plenum 325, and third plenum 360 can be defined (e.g., via etching, engraving, or machining) on the surface 220 of the apparatus 215. The first plenum 310 can be coupled with an inlet 300 to receive a fluid. The first plenum 310 can pass the fluid from the inlet on an initial end 315 toward a terminal end 320. The second plenum 325 can be fluidly coupled with the first plenum 310 via one or more other structures on the surface 220.

The method 1300 can include coupling a channel 345 with the first plenum 310 and the second plenum 325 (ACT 1310). One or more channels 345 can be defined (e.g., via etching, engraving, or machining) within a channel region 340 between the first plenum 310 and the second plenum 325. The channels 345 can be substantially parallel (e.g., within 15% deviation) with one another. Each channel 345 can be fluidly coupled with the first plenum 310 on an initial end 350 to receive the fluid passed from the inlet 300 via the first plenum 310. Each channel 345 can also be fluidly coupled with the second plenum 325 on a terminal end 355 to convey the fluid from the first plenum 310 and into the second plenum 325.

The method 1300 can include coupling the third plenum 360 with the second plenum 325 (ACT 1315). An initial end 365 of the third plenum 360 can be fluidly coupled with a terminal end of the second plenum 325 to receive the fluid from second plenum 325. The third plenum 360 can pass the received fluid to an outlet 305 on a terminal end 370. The method 1300 can include coupling a bypass 375 with the second plenum 325 and the third plenum 360 (ACT 1320). The bypass 375 can be defined (e.g., via etching, engraving, or machining) in a portion of the surface 220 on the apparatus 215 between the second plenum 325 and the third plenum 360. The bypass 375 can pass the fluid collected in the second plenum 325 into the third plenum 360.

Figure 14:
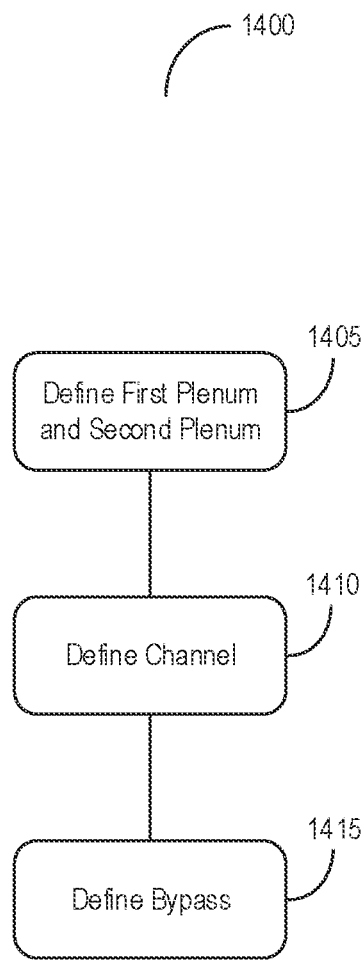
FIG. 14 depicts a flow diagram of an example of a method of assembling an apparatus to regulate heat transfer.

FIG. 14 depicts a flow diagram of a method 1400 of assembling the apparatus 215 to regulate heat transfer. The method 1400 can defining a first plenum 310 and a second plenum 325 (ACT 1405). The first plenum 310 and the second plenum 325 can be defined (e.g., via etching, engraving, or machining) on the surface 220 of the apparatus 215. The first plenum 310 can be coupled with an inlet 300 to receive a fluid. The first plenum 310 can pass the fluid from the inlet 300 on an initial end 315 toward a terminal end 320. The second plenum 325 can be fluidly coupled with the first plenum 310 via one or more other structures on the surface 220. The second plenum 325 can be fluidly coupled with an outlet 305 on a terminal end 335. The second plenum 325 can have one or more segments 1000 and 1005. The second plenum 325 can convey the fluid received from the other structures via the one or more structure to pass to the outlet 305 on the terminal end.

The method 1400 can include defining a channel 345 (ACT 1410). One or more channels 345 can be defined (e.g., via etching, engraving, or machining) within a channel region 340 in a portion of the surface 220 at least partially defined by the first plenum 310 and the second plenum 325. The channels 345 can be serpentine, spanning along the surface 220 between the first plenum 310 and the second plenum 325. Each channel 345 can be fluidly coupled with the first plenum 310 on an initial end 350 to receive the fluid passed from the inlet 300 via the first plenum 310. Each channel 345 can also be fluidly coupled with the second plenum 325 on a terminal end 355 to convey the fluid from the first plenum 310 and into the second plenum 325. The method 1400 can include defining a bypass 375 (ACT 1415). The bypass 375 can be defined (e.g., via etching, engraving, or machining) along the distal edge 240 of the surface 220. The bypass 375 can pass the fluid from the first plenum 310 to the second plenum 325. One or more other structures (e.g., the basin 1110) can also be defined on the surface 220 of the apparatus 215 and coupled with other structures to convey the fluid.

Figure 15:
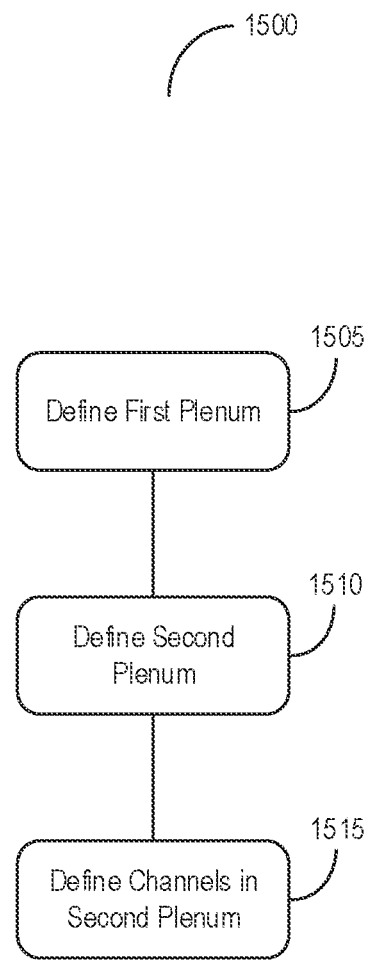
FIG. 15 depicts a flow diagram of an example of a method of assembling an apparatus to regulate heat transfer.

FIG. 15 depicts a flow diagram of a method 1500 of assembling the apparatus 215 to regulate heat transfer. The method 1500 can include defining a first plenum 310 (e.g., third segment 710) (ACT 1505). The first plenum 310 can be defined (e.g., via etching, engraving, or machining) along the surface 220 of the apparatus 215. The first plenum 310 can span along the first lateral edge 230, the distal edge 240, the second lateral edge 235, and at least a portion of the manifold edge 225. The first plenum 310 can have an initial end 315 fluidly coupled with an inlet 300 to receive fluid and a terminal end 320 toward which to convey the fluid. The first plenum 310 can have one or more segments 900-915, with one or more turns 920-930 to direct the flow of the fluid between the initial end and the terminal end.

The method 1500 can include defining a second plenum 325 (ACT 1510). The second plenum 325 can be defined (e.g., via etching, engraving, or machining) along the surface 220 of the apparatus 215. The second plenum 325 can span from an interior of the surface 220 to the manifold edge 225. The second plenum 325 can have an initial end 330 fluidly coupled with the first plenum 310 to receive the fluid conveyed from the first plenum 310. The second plenum 325 can have a terminal end 335 fluidly coupled with an outlet 305 to release the fluid. The method 1500 can include defining channels 345 in the second plenum 325 (ACT 1515). One or more channels 345 can be defined (e.g., via etching, engraving, or machining) within the second plenum 325. Each channel 345 can be fluidly coupled with the first plenum 310 toward the initial end of the second plenum 325 and with the outlet 305 toward the terminal end of the second plenum 325. Each channel 345 can pass the fluid from the initial end of the second plenum 325 to the terminal end of the second plenum 325 to release the fluid into the outlet.

Figure 16:
FIG. 16 depicts a flow diagram of an example of a method of providing an apparatus to regulate heat transfer.

FIG. 16 depicts a flow diagram of a method 1600 of providing the apparatus 215 to regulate heat transfer. The method 1600 can include providing the apparatus 215 (ACT 1605). The apparatus 215 can be thermally coupled with the battery pack 110 or one or more battery modules 115 to regulate the heat emanated from the battery cells 120 housed therein. The apparatus 215 can be installed, equipped, or otherwise provisioned between a top set of battery modules 115 and a bottom set of battery modules 115 within the battery pack 110. The battery pack 110 can be disposed in an electric vehicle 105 to power various components electrically coupled therewith. The apparatus 215 can include one or more plenums (e.g., the first plenum 310, the second plenum 325, and the third plenum 360), channels 345, and other structures to carry, pass, or otherwise convey the fluid to distribute the heat generated by the battery cells 120 during operation.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−15% or +/−15 degrees of pure vertical, parallel or perpendicular positioning. References to "approximately,"

"substantially" or other terms of degree include variations of +/−15% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
 a first plenum spanning along a first edge from an inlet corner to a fourth edge, the inlet corner defining an inlet port between the first edge and a third edge;
 a second plenum spanning at a first offset relative from a second edge and having an end, the second edge opposite of the first edge;
 a third plenum spanning within the first offset between the second edge and the second plenum from an outlet corner, the outlet corner defining an outlet port between the second edge and the third edge, the third plenum coupled with the second plenum via the end;
 a channel coupled with the first plenum and with the second plenum, the channel arranged between the first plenum along the first edge and the second plenum along the second edge, the channel spanning relative to the third edge; and
 a bypass coupled with the second plenum and with the third plenum at a second offset relative to the end of the second plenum.

2. The apparatus of claim 1, comprising:
 the first plenum coupled with the inlet port, the inlet port to receive coolant to pass to the second plenum via the channel; and
 the second plenum coupled with the outlet port, the outlet port to release the coolant passed via the end of the second plenum and via the bypass.

3. The apparatus of claim 1, comprising:
 the channel substantially orthogonal with the first plenum, the channel substantially orthogonal with the second plenum.

4. The apparatus of claim 1, comprising:
 a second channel substantially parallel with the channel, the second channel coupled with the first plenum and the second plenum.

5. The apparatus of claim 1, comprising:
 the bypass defined between the second plenum and the third plenum to fluidly couple the second plenum with the third plenum, the bypass at the second offset relative to the end of the second plenum.

6. The apparatus of claim 1, comprising:
 the bypass defined between the second plenum and the third plenum, the bypass at a third offset relative to the outlet port coupled with the third plenum.

7. The apparatus of claim 1, comprising:
 the channel aligned between the bypass and the end of the second plenum; and
 a second channel aligned between the bypass and a second end of the second plenum, the second end opposite of the end of the second plenum.

8. The apparatus of claim 1, comprising:
 at least a portion of the first plenum substantially parallel with at least a portion of the second plenum.

9. The apparatus of claim 1, comprising:
 the channel having a width less than or equal to at least one of a width of the first plenum, a width of the second plenum, or a width of the third plenum.

10. The apparatus of claim 1, comprising:
 the channel having a width greater than or equal to at least one of a width of the first plenum, a width of the second plenum, or a width of the third plenum.

11. A method, comprising:
 defining a first plenum spanning along a first edge from an inlet corner to a fourth edge, the inlet corner defining an inlet port between the first edge and a third edge;
 defining a second plenum spanning at a first offset relative from a second edge opposite of the first edge and having an end on the fourth edge, the fourth edge spanning between the first edge and the second edge, the fourth edge opposite of the third edge;
 defining a third plenum spanning within the first offset between the second edge and the second plenum from an outlet corner to the fourth edge, the outlet corner defining an outlet port between the second edge and the third edge, the third plenum coupled with the second plenum via the end;
 coupling a channel with the first plenum,
 coupling the channel with the second plenum, the channel arranged between the first plenum along the first edge and the second plenum along the second edge, the channel spanning relative to at least one of the third edge or the fourth edge;
 coupling the third plenum with the second plenum; and
 coupling a bypass with the second plenum and with the third plenum at a second offset relative to the end of the second plenum on the fourth edge.

12. The method of claim 11, comprising
 coupling the first plenum with the inlet port, the inlet port to receive coolant to pass to the second plenum via the channel; and
 coupling the third plenum with the outlet port, the outlet port to release the coolant passed via the end of the second plenum and via the bypass.

13. The method of claim 11, comprising
 arranging the channel between the first plenum and the second plenum, the channel substantially orthogonal with the first plenum, the channel substantially orthogonal with the second plenum.

14. The method of claim 11, comprising
 defining the bypass between the second plenum and the third plenum to fluidly couple the second plenum with the third plenum, the bypass at a third offset relative to the end of the second plenum.

15. The method of claim 11, comprising
 aligning the channel between the bypass and the end of the second plenum; and
 aligning a second channel between the bypass and a second end of the second plenum, the second end opposite of the end of the second plenum.

16. An electric vehicle, comprising
 a battery pack to power one or more components of the electric vehicle;
 a battery module disposed in the battery pack;
 a cold plate coupled with the battery module, the cold plate comprising:
  a first plenum spanning along a first edge of the cold plate from an inlet corner to a fourth edge, the inlet corner defining an inlet port between the first edge and a third edge;
  a second plenum spanning at a first offset relative from a second edge of the cold plate and having an end on the fourth edge, the second edge opposite of the first edge, the fourth edge spanning between the first edge and the second edge, the fourth edge opposite of the third edge;

a channel coupled with the first plenum, the channel coupled with the second plenum, the channel arranged between the first plenum along the first edge and the second plenum along the second edge, the channel spanning relative to at least one of the third edge or the fourth edge;

a third plenum coupled with the second plenum, the third plenum spanning within the first offset between the second edge and the second plenum from an outlet corner to the fourth edge, the outlet corner defining an outlet port between the second edge and the third edge, the third plenum coupled with the second plenum via the end; and a bypass coupled with the second plenum and with the third plenum at a second offset relative to the end of the second plenum on the fourth edge.

17. The electric vehicle of claim 16, comprising the cold plate comprising:

the first plenum coupled with the inlet port to receive coolant to pass to the second plenum via the channel; and the third plenum coupled with the outlet port to release the coolant passed via the end of the second plenum and the bypass.

18. The electric vehicle of claim 16, comprising the cold plate comprising:

the channel substantially orthogonal with the first plenum, the channel substantially orthogonal with the second plenum.

19. The electric vehicle of claim 16, comprising the cold plate comprising:

the bypass defined between the second plenum and the third plenum, the bypass at a third offset relative to the outlet port coupled with the third plenum.

20. The electric vehicle of claim 16, comprising the cold plate comprising:

the channel aligned between the bypass and the end of the second plenum; and a second channel aligned between the bypass and a second end of the second plenum, the second end opposite of the end of the second plenum.

* * * * *